(12) United States Patent
Ibrahim et al.

(10) Patent No.: US 12,641,466 B2
(45) Date of Patent: May 26, 2026

(54) EFFICIENT FULL-DUPLEX CHANNEL STATE INFORMATION REPORTING

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(*) Notice: Subject to any disclaimer, the term of this patent is extended or adjusted under 35 U.S.C. 154(b) by 309 days.

(21) Appl. No.: 18/422,757

(22) Filed: Jan. 25, 2024

(65) Prior Publication Data

US 2024/0276267 A1    Aug. 15, 2024

Related U.S. Application Data

(60) Provisional application No. 63/445,664, filed on Feb. 14, 2023.

(51) Int. Cl.
*H04W 24/10* (2009.01)
*H04L 5/14* (2006.01)

(52) U.S. Cl.
CPC ............... *H04W 24/10* (2013.01); *H04L 5/14* (2013.01)

(58) Field of Classification Search
CPC .... H04W 24/10; H04W 72/0446; H04L 5/14; H04L 5/0057; H04L 5/0094
See application file for complete search history.

(56) References Cited

U.S. PATENT DOCUMENTS

| | | | |
|---|---|---|---|
| 2017/0054544 A1* | 2/2017 | Kazmi | H04L 5/14 |
| 2019/0222283 A1 | 7/2019 | Yum et al. | |
| 2024/0107525 A1* | 3/2024 | Khan Beigi | H04L 5/1469 |
| 2024/0107541 A1* | 3/2024 | Mahama | H04L 5/0051 |
| 2024/0114374 A1* | 4/2024 | Chege | H04W 24/10 |

FOREIGN PATENT DOCUMENTS

WO    WO-2021217328 A1    11/2021

OTHER PUBLICATIONS

International Search Report and Written Opinion—PCT/US2024/013121—ISA/EPO—May 22, 2024.

* cited by examiner

*Primary Examiner* — Kevin T Bates
*Assistant Examiner* — Hector Reyes

(57) ABSTRACT

Methods, systems, and devices for wireless communications are described. A user equipment (UE) may receive control signaling indicating at least one reporting configuration for a channel state information (CSI) report, where the at least one reporting configuration identifies a first uplink resource for reporting the CSI report in a full-duplex slot type and a second uplink resource for reporting the CSI report in a half-duplex slot type. The control signaling may further indicate one or more resources for a reference signal, such that the UE may monitor, in accordance with the at least one reporting configuration, for the reference signal resource to generate a measurement for the CSI report. The UE may transmit the CSI report via an uplink resource corresponding to one of the first uplink resource or the second uplink resource based a slot type of a transmission slot of the uplink resource.

30 Claims, 17 Drawing Sheets

130

105

115

Network
Entity

Transceiver

1310

Antenna

1315

Communications
Manager

1320

Memory

Code

1330

1325

1340

Processor

1335

1305

1300

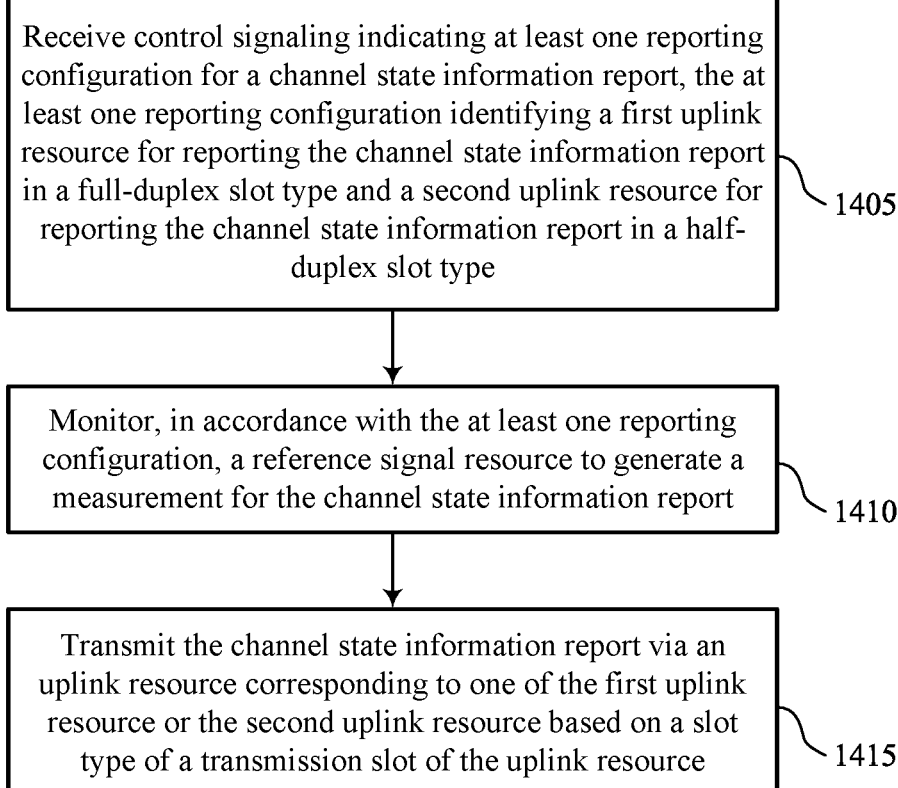

Receive control signaling indicating at least one reporting configuration for a channel state information report, the at least one reporting configuration identifying a first uplink resource for reporting the channel state information report in a full-duplex slot type and a second uplink resource for reporting the channel state information report in a half-duplex slot type

1405

Monitor, in accordance with the at least one reporting configuration, a reference signal resource to generate a measurement for the channel state information report

1410

Transmit the channel state information report via an uplink resource corresponding to one of the first uplink resource or the second uplink resource based on a slot type of a transmission slot of the uplink resource

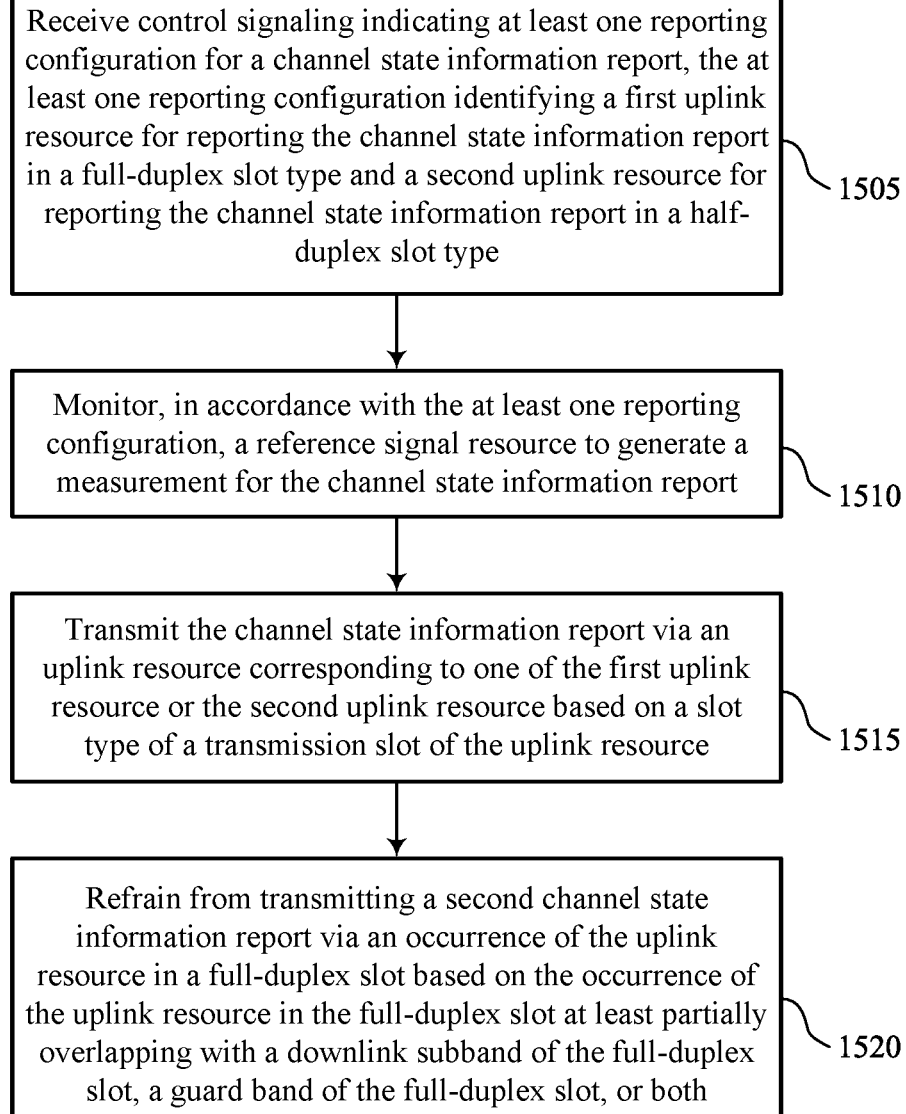

Receive control signaling indicating at least one reporting configuration for a channel state information report, the at least one reporting configuration identifying a first uplink resource for reporting the channel state information report in a full-duplex slot type and a second uplink resource for reporting the channel state information report in a half-duplex slot type

1505

Monitor, in accordance with the at least one reporting configuration, a reference signal resource to generate a measurement for the channel state information report

1510

Transmit the channel state information report via an uplink resource corresponding to one of the first uplink resource or the second uplink resource based on a slot type of a transmission slot of the uplink resource

1515

Refrain from transmitting a second channel state information report via an occurrence of the uplink resource in a full-duplex slot based on the occurrence of the uplink resource in the full-duplex slot at least partially overlapping with a downlink subband of the full-duplex slot, a guard band of the full-duplex slot, or both

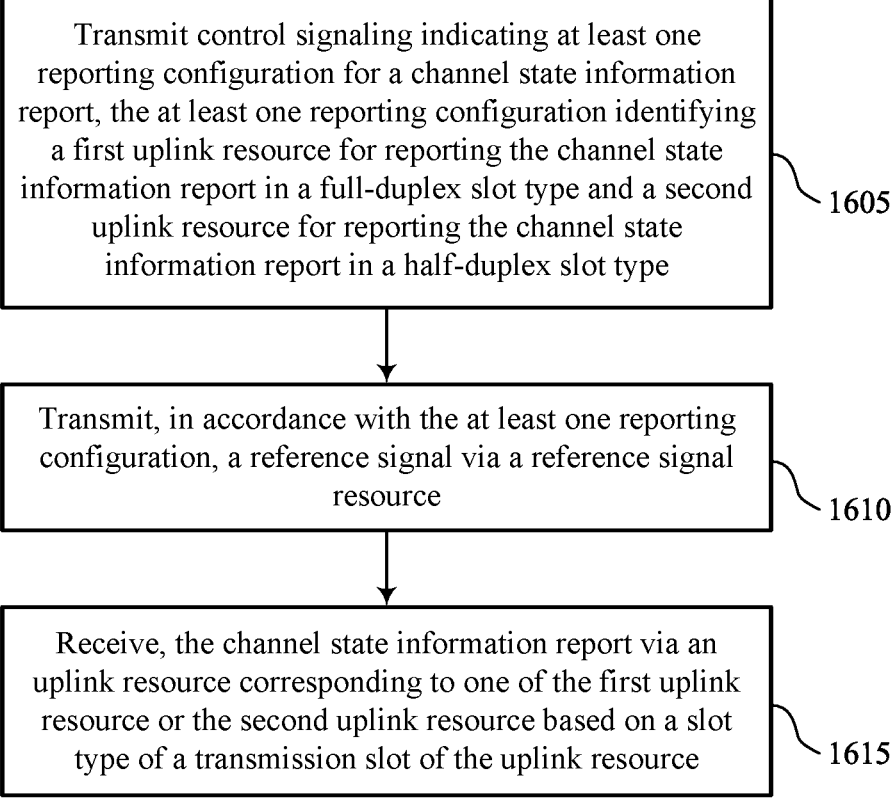

Transmit control signaling indicating at least one reporting configuration for a channel state information report, the at least one reporting configuration identifying a first uplink resource for reporting the channel state information report in a full-duplex slot type and a second uplink resource for reporting the channel state information report in a half-duplex slot type

1605

Transmit, in accordance with the at least one reporting configuration, a reference signal via a reference signal resource

1610

Receive, the channel state information report via an uplink resource corresponding to one of the first uplink resource or the second uplink resource based on a slot type of a transmission slot of the uplink resource

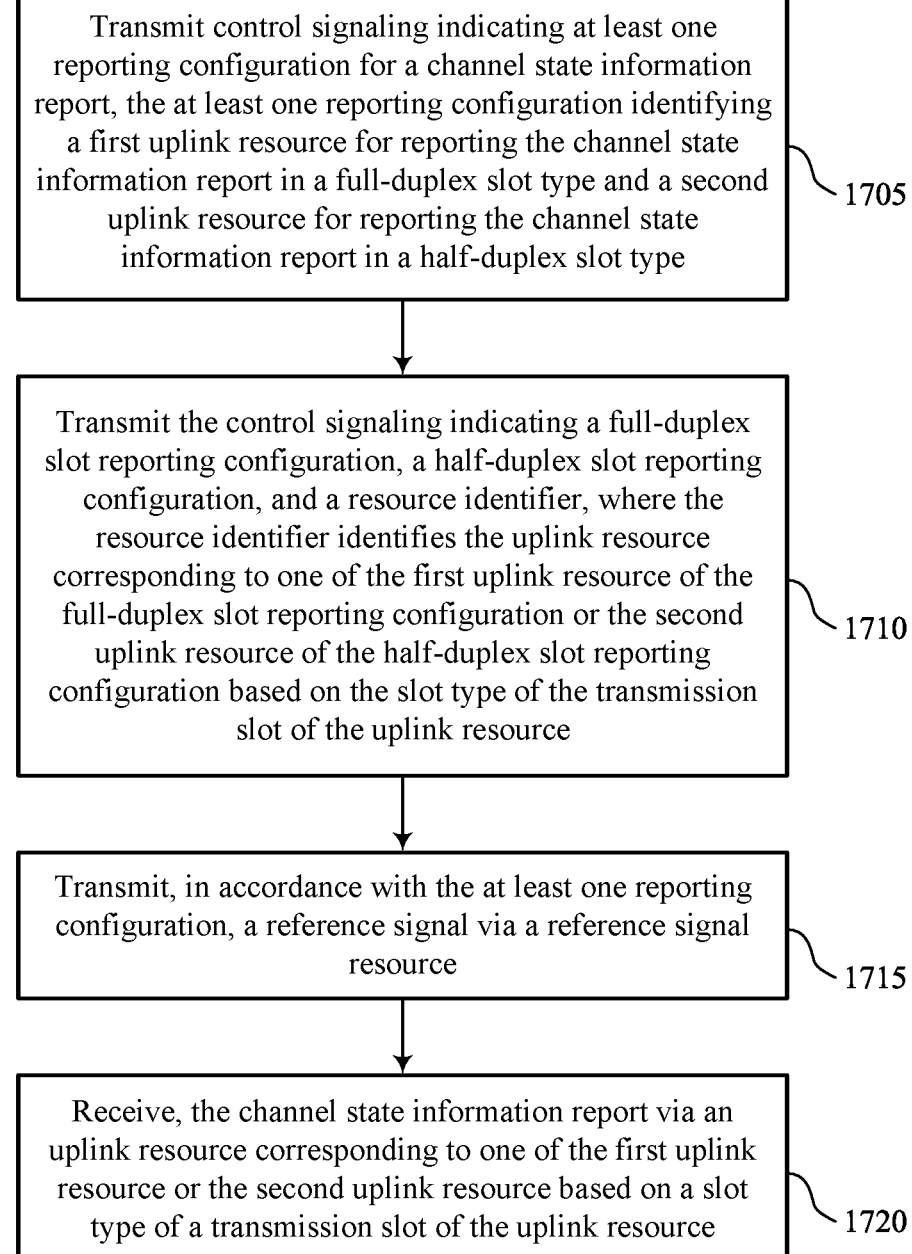

Transmit control signaling indicating at least one reporting configuration for a channel state information report, the at least one reporting configuration identifying a first uplink resource for reporting the channel state information report in a full-duplex slot type and a second uplink resource for reporting the channel state information report in a half-duplex slot type

1705

Transmit the control signaling indicating a full-duplex slot reporting configuration, a half-duplex slot reporting configuration, and a resource identifier, where the resource identifier identifies the uplink resource corresponding to one of the first uplink resource of the full-duplex slot reporting configuration or the second uplink resource of the half-duplex slot reporting configuration based on the slot type of the transmission slot of the uplink resource

1710

Transmit, in accordance with the at least one reporting configuration, a reference signal via a reference signal resource

1715

Receive, the channel state information report via an uplink resource corresponding to one of the first uplink resource or the second uplink resource based on a slot type of a transmission slot of the uplink resource

EFFICIENT FULL-DUPLEX CHANNEL STATE INFORMATION REPORTING

CROSS REFERENCE

The present Application for Patent claims the benefit of U.S. Provisional Patent Application No. 63/445,664 by IBRAHIM et al., entitled "EFFICIENT FULL-DUPLEX CHANNEL STATE INFORMATION REPORTING," filed Feb. 14, 2023, assigned to the assignee hereof, and expressly incorporated by reference herein.

FIELD OF TECHNOLOGY

The following relates to wireless communications, including efficient full-duplex channel state information reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support efficient full-duplex channel state information (CSI) reporting. For example, the described techniques provide for a network entity to configure a user equipment (UE) with an uplink resource for CSI reporting in a full-duplex slot and an uplink resource for CSI reporting in a half-duplex slot type. As such, the UE may use, based on a transmission slot type, either the first or second uplink resource to transmit the CSI report. Alternatively, the described techniques provide for a UE to adapt an uplink resource to fit within an uplink subband of a full-duplex slot and reduce, or otherwise drop, portions of the CSI report.

A method for wireless communications at a UE is described. The method may include receiving control signaling indicating at least one reporting configuration for a CSI report, the at least one reporting configuration identifying a first uplink resource for reporting the CSI report in a full-duplex slot type and a second uplink resource for reporting the CSI report in a half-duplex slot type, monitoring, in accordance with the at least one reporting configuration, a reference signal resource to generate a measurement for the CSI report, and transmitting the CSI report via an uplink resource corresponding to one of the first uplink resource or the second uplink resource based on a slot type of a transmission slot of the uplink resource.

An apparatus for wireless communications at a UE is described. The apparatus may include one or more processors, one or more memories coupled with the one or more processors, and instructions stored in the one or more memories. The instructions may be executable by the one or more processors to cause the apparatus to receive control signaling indicating at least one reporting configuration for a CSI report, the at least one reporting configuration identifying a first uplink resource for reporting the CSI report in a full-duplex slot type and a second uplink resource for reporting the CSI report in a half-duplex slot type, monitor, in accordance with the at least one reporting configuration, a reference signal resource to generate a measurement for the CSI report, and transmit the CSI report via an uplink resource corresponding to one of the first uplink resource or the second uplink resource based on a slot type of a transmission slot of the uplink resource.

Another apparatus for wireless communications at a UE is described. The apparatus may include means for receiving control signaling indicating at least one reporting configuration for a CSI report, the at least one reporting configuration identifying a first uplink resource for reporting the CSI report in a full-duplex slot type and a second uplink resource for reporting the CSI report in a half-duplex slot type, means for monitoring, in accordance with the at least one reporting configuration, a reference signal resource to generate a measurement for the CSI report, and means for transmitting the CSI report via an uplink resource corresponding to one of the first uplink resource or the second uplink resource based on a slot type of a transmission slot of the uplink resource.

A non-transitory computer-readable medium storing code for wireless communications at a UE is described. The code may include instructions executable by one or more processors to receive control signaling indicating at least one reporting configuration for a CSI report, the at least one reporting configuration identifying a first uplink resource for reporting the CSI report in a full-duplex slot type and a second uplink resource for reporting the CSI report in a half-duplex slot type, monitor, in accordance with the at least one reporting configuration, a reference signal resource to generate a measurement for the CSI report, and transmit the CSI report via an uplink resource corresponding to one of the first uplink resource or the second uplink resource based on a slot type of a transmission slot of the uplink resource.

In some examples of the method, apparatuses, and non-transitory computer-readable medium described herein, receiving the control signaling indicating the at least one reporting configuration may include operations, features, means, or instructions for receiving the control signaling indicating a full-duplex slot reporting configuration, a half-duplex slot reporting configuration, and a resource identifier, where the resource identifier identifies the uplink resource corresponding to one of the first uplink resource of the full-duplex slot reporting configuration or the second uplink resource of the half-duplex slot reporting configuration based on the slot type of the transmission slot of the uplink resource.

In some examples of the method, apparatuses, and non-transitory computer-readable medium described herein, receiving the control signaling may include operations, features, means, or instructions for receiving the control signaling indicating the at least one reporting configuration that identifies a first list of one or more uplink resources for reporting the CSI report in the full-duplex slot type and a second list of one or more uplink resources for reporting the CSI report in the half-duplex slot type, where the first list of one or more uplink resources includes the first uplink resource and the second list of one or more uplink resources includes the second uplink resource.

In some examples of the method, apparatuses, and non-transitory computer-readable medium described herein, receiving the control signaling may include operations, features, means, or instructions for receiving the control signaling indicating the at least one reporting configuration that identifies a first resource identifier corresponding to the first uplink resource for reporting the CSI report in the full-duplex slot type and a second resource identifier corresponding to the second uplink resource for reporting the CSI report in a half-duplex slot type.

In some examples of the method, apparatuses, and non-transitory computer-readable medium described herein, transmitting the CSI report may include operations, features, means, or instructions for transmitting, via the uplink resource, the CSI report that may be a wideband CSI report based on the uplink resource including a portion of the first uplink resource that may be adapted to fit within an uplink subband of the transmission slot that may be a full-duplex slot.

Some examples of the method, apparatuses, and non-transitory computer-readable medium described herein may further include operations, features, means, or instructions for refraining from transmitting a second CSI report via an occurrence of the uplink resource in a full-duplex slot based on a quantity of resource elements in the occurrence of the uplink resource in the full-duplex slot.

In some examples of the method, apparatuses, and non-transitory computer-readable medium described herein, transmitting the CSI report may include operations, features, means, or instructions for transmitting, via the uplink resource, the CSI report that may be a wideband CSI report via the uplink resource based on a quantity of resource elements of the uplink resource, the uplink resource including a portion of the first uplink resource that may be adapted to fit within an uplink subband of the transmission slot that may be a full-duplex slot.

In some examples of the method, apparatuses, and non-transitory computer-readable medium described herein, the CSI report includes wideband CSI and subband CSI based on a quantity of resource elements of the uplink resource, the uplink resource including a portion of the first uplink resource that may be adapted to fit within an uplink subband of the transmission slot that may be a full-duplex slot.

Some examples of the method, apparatuses, and non-transitory computer-readable medium described herein may further include operations, features, means, or instructions for refraining from transmitting a second CSI report via an occurrence of the uplink resource in a full-duplex slot based on the occurrence of the uplink resource in the full-duplex slot at least partially overlapping with a downlink subband of the full-duplex slot, a guard band of the full-duplex slot, or both.

In some examples of the method, apparatuses, and non-transitory computer-readable medium described herein, the uplink resource includes a portion of the first uplink resource that may be adapted to fit within an uplink subband of a full-duplex slot.

In some examples of the method, apparatuses, and non-transitory computer-readable medium described herein, the uplink resource corresponds to the first uplink resource based on the slot type of the transmission slot being the full duplex slot type.

In some examples of the method, apparatuses, and non-transitory computer-readable medium described herein, the uplink resource corresponds to the second uplink resource based on the slot type of the transmission slot being the half duplex slot type.

A method for wireless communications at a network entity is described. The method may include transmitting control signaling indicating at least one reporting configuration for a CSI report, the at least one reporting configuration identifying a first uplink resource for reporting the CSI report in a full-duplex slot type and a second uplink resource for reporting the CSI report in a half-duplex slot type, transmitting, in accordance with the at least one reporting configuration, a reference signal via a reference signal resource, and receiving, the CSI report via an uplink resource corresponding to one of the first uplink resource or the second uplink resource based on a slot type of a transmission slot of the uplink resource.

An apparatus for wireless communications at a network entity is described. The apparatus may include one or more processors, one or more memories coupled with the one or more processors, and instructions stored in the one or more memories. The instructions may be executable by the one or more processors to cause the apparatus to transmit control signaling indicating at least one reporting configuration for a CSI report, the at least one reporting configuration identifying a first uplink resource for reporting the CSI report in a full-duplex slot type and a second uplink resource for reporting the CSI report in a half-duplex slot type, transmit, in accordance with the at least one reporting configuration, a reference signal via a reference signal resource, and receive, the CSI report via an uplink resource corresponding to one of the first uplink resource or the second uplink resource based on a slot type of a transmission slot of the uplink resource.

Another apparatus for wireless communications at a network entity is described. The apparatus may include means for transmitting control signaling indicating at least one reporting configuration for a CSI report, the at least one reporting configuration identifying a first uplink resource for reporting the CSI report in a full-duplex slot type and a second uplink resource for reporting the CSI report in a half-duplex slot type, means for transmitting, in accordance with the at least one reporting configuration, a reference signal via a reference signal resource, and means for receiving, the CSI report via an uplink resource corresponding to one of the first uplink resource or the second uplink resource based on a slot type of a transmission slot of the uplink resource.

A non-transitory computer-readable medium storing code for wireless communications at a network entity is described. The code may include instructions executable by one or more processors to transmit control signaling indicating at least one reporting configuration for a CSI report, the at least one reporting configuration identifying a first uplink resource for reporting the CSI report in a full-duplex slot type and a second uplink resource for reporting the CSI report in a half-duplex slot type, transmit, in accordance with the at least one reporting configuration, a reference signal via a reference signal resource, and receive, the CSI report via an uplink resource corresponding to one of the first uplink resource or the second uplink resource based on a slot type of a transmission slot of the uplink resource.

In some examples of the method, apparatuses, and non-transitory computer-readable medium described herein, transmitting the control signaling indicating the at least one reporting configuration may include operations, features, means, or instructions for transmitting the control signaling indicating a full-duplex slot reporting configuration, a half-duplex slot reporting configuration, and a resource identifier, where the resource identifier identifies the uplink resource corresponding to one of the first uplink resource of the full-duplex slot reporting configuration or the second uplink resource of the half-duplex slot reporting configuration based on the slot type of the transmission slot of the uplink resource.

In some examples of the method, apparatuses, and non-transitory computer-readable medium described herein, transmitting the control signaling may include operations, features, means, or instructions for transmitting the control signaling indicating the at least one reporting configuration that identifies a first list of one or more uplink resources for reporting the CSI report in the full-duplex slot type and a second list of one or more uplink resources for reporting the CSI report in the half-duplex slot type, where the first list of one or more uplink resources includes the first uplink resource and the second list of one or more uplink resources includes the second uplink resource.

In some examples of the method, apparatuses, and non-transitory computer-readable medium described herein, transmitting the control signaling may include operations, features, means, or instructions for transmitting the control signaling indicating the at least one reporting configuration that identifies a first resource identifier corresponding to the first uplink resource for reporting the CSI report in the full-duplex slot type and a second resource identifier corresponding to the second uplink resource for reporting the CSI report in a half-duplex slot type.

In some examples of the method, apparatuses, and non-transitory computer-readable medium described herein, a second CSI report may be dropped during an occurrence of the uplink resource in a full-duplex slot based on the occurrence of the uplink resource in the full-duplex slot at least partially overlapping with a downlink subband of the full-duplex slot, a guard band of the full-duplex slot, or both.

In some examples of the method, apparatuses, and non-transitory computer-readable medium described herein, receiving the CSI report may include operations, features, means, or instructions for receiving, via the uplink resource, the CSI report that may be a wideband CSI report based on the uplink resource including a portion of the first uplink resource that may be adapted to fit within an uplink subband of the transmission slot that may be a full-duplex slot.

In some examples of the method, apparatuses, and non-transitory computer-readable medium described herein, a second CSI report may be dropped during an occurrence of the uplink resource in a full-duplex slot based on a quantity of resource elements in the occurrence of the uplink resource in the full-duplex slot.

In some examples of the method, apparatuses, and non-transitory computer-readable medium described herein, receiving the CSI report may include operations, features, means, or instructions for receiving, via the uplink resource, the CSI report that may be a wideband CSI report via the uplink resource based on a quantity of resource elements of the uplink resource, the uplink resource including a portion of the first uplink resource that may be adapted to fit within an uplink subband of the transmission slot that may be a full-duplex slot.

In some examples of the method, apparatuses, and non-transitory computer-readable medium described herein, the CSI report includes wideband CSI and subband CSI based on a quantity of resource elements of the uplink resource, the uplink resource including a portion of the first uplink resource that may be adapted to fit within an uplink subband of a full-duplex slot.

In some examples of the method, apparatuses, and non-transitory computer-readable medium described herein, the uplink resource includes a portion of the first uplink resource that may be adapted to fit within an uplink subband of a full-duplex slot.

In some examples of the method, apparatuses, and non-transitory computer-readable medium described herein, the uplink resource corresponds to the first uplink resource based on the slot type of the transmission slot being the full duplex slot type.

In some examples of the method, apparatuses, and non-transitory computer-readable medium described herein, the uplink resource corresponds to the second uplink resource based on the slot type of the transmission slot being the half duplex slot type.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIGS. 14 through 17 illustrate flowcharts showing methods that support efficient full-duplex CSI reporting in accordance with one or more aspects of the present disclosure.

DETAILED DESCRIPTION

Figure 1:
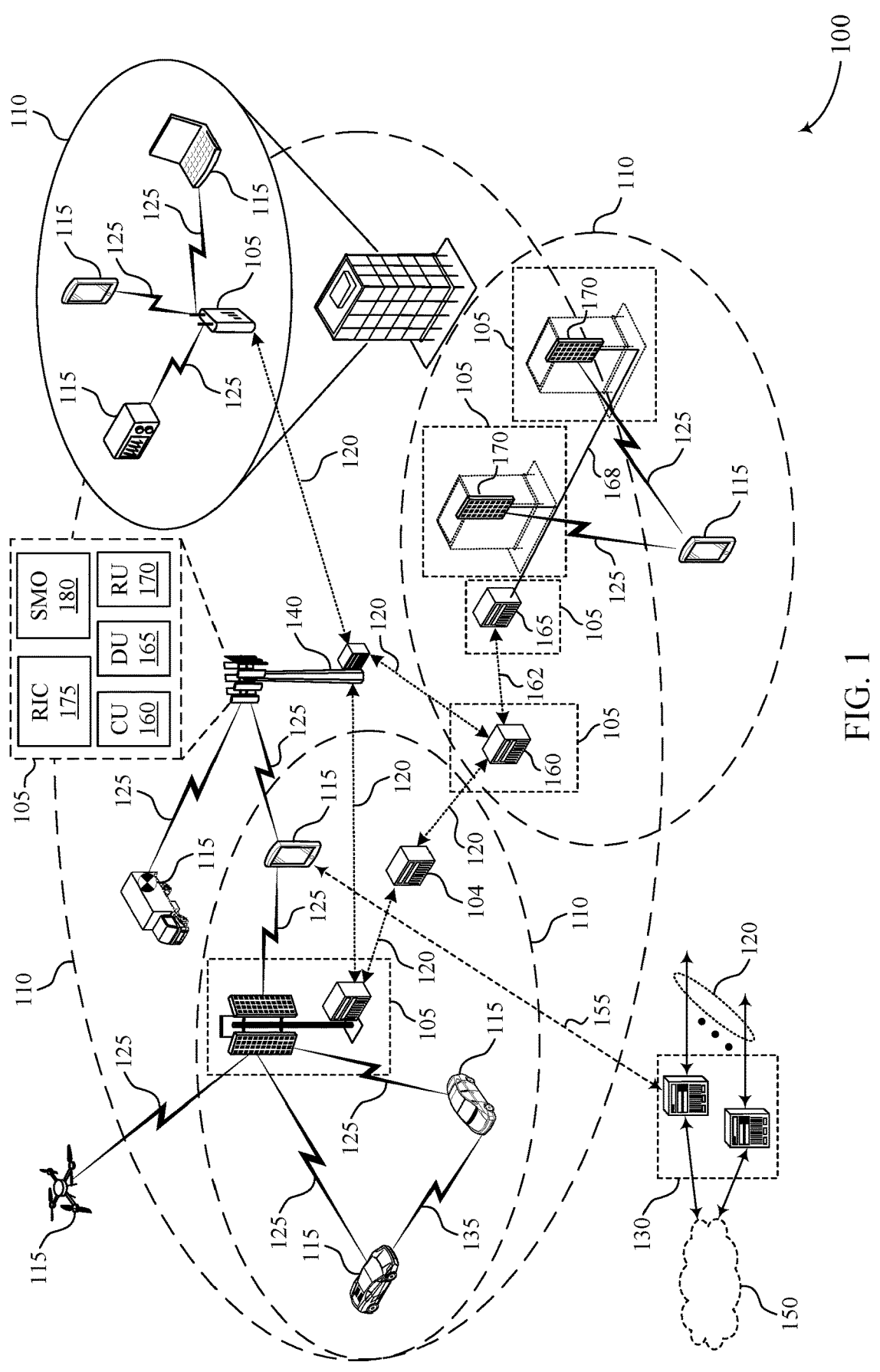
FIG. 1 illustrates an example of a wireless communications system that supports efficient full-duplex channel state information (CSI) reporting in accordance with one or more aspects of the present disclosure.

In some wireless communications systems, a user equipment (UE) and a network entity may perform full-duplex communications. For example, the UE may transmit one or more uplink messages to the network entity, while simultaneously receiving one or more downlink messages from the network entity. To facilitate such communications, the network entity and UE may use sub-band full-duplex (SBFD) slots, where a first portion of the SBFD slot is allocated for downlink communications (e.g., an upper frequency range and lower frequency range are allocated for downlink communications) and a second portion of the SBFD slot is allocated for uplink communications (e.g., the frequency range between the upper and lower frequency ranges for downlink communications). Further, in such slots, there may be one or more frequency resources that separate the uplink communications and downlink communications, where such frequency resources may be referred to as a guard band. In some cases, however, while performing the full duplex communications, a physical uplink control channel (PUCCH) transmission (e.g., including a channel state information (CSI) report), may overlap with the first portion of the SBFD slots (e.g., the downlink portion) or overlap with the guard band. In such cases, the PUCCH transmission may interfere with the downlink communications, resulting in communication interference or dropped transmissions. As such, the network entity may not receive the PUCCH transmission that includes the CSI report, resulting in increased latency, degraded channel quality, or both.

The techniques, methods, and devices described herein may provide for a configuration of uplink resources for CSI reporting in SBFD slots. In some examples, the UE may receive a CSI report configuration indicating a first uplink resource for full-duplex slot types (e.g., SBFD slots) and a second uplink resource for half-duplex slot types. The UE may monitor for a reference signal in order to generate the CSI report and transmit the CSI report via an uplink resource that corresponds to either the first uplink resource or second uplink resource. That is, the UE may select either the first uplink resource or second uplink resource to use for CSI reporting based on a type of transmission slot for reporting the CSI. In some other examples, the UE may adapt the uplink resource used for transmission of the CSI report to fit entirely within an uplink subband of a full-duplex slot. For example, the UE may reduce, or otherwise drop, portions of the CSI report based on a quantity of resource elements in the adapted uplink resource, such that the PUCCH transmission may not overlap with the downlink subband or guard band of full-duplex slots. In this way, the UE may transmit the CSI report via a resource for either half or full duplex slots, resulting in less interference.

Aspects of the disclosure are initially described in the context of wireless communications systems. Aspects of the disclosure are further described in the context of a resource diagram and a process flow. Aspects of the disclosure are further illustrated by and described with reference to apparatus diagrams, system diagrams, and flowcharts that relate to efficient full-duplex CSI reporting.

FIG. 1 illustrates an example of a wireless communications system 100 that supports efficient full-duplex CSI reporting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support efficient full-duplex CSI reporting as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, the UE 115 and network entity 105 may perform half-duplex communications via respective uplink and downlink slots (e.g., otherwise referred to as symbols). Alternatively, the UE 115 and network entity 105 may perform full-duplex communications via a slot with frequency resources configured for both uplink and downlink communications (e.g., such as SBFD symbols or slots).

To facilitate such communications, studies and enhancements for uplink transmissions and downlink receptions across SBFD symbols and non-SBFD symbols may be implemented. For example, such studies and enhancements may include physical downlink control channel (PDCCH) transmissions and scheduling and configuring of PUCCH, physical uplink shared channel (PUSCH), physical downlink shared channel (PDSCH) transmissions, without repetition in SBFD symbols and non-SBFD symbols. Further studies and enhancements may include scheduled and configured sounding reference signal (SRS) and CSI reference signal (CSI-RS) transmissions in SBFD symbols and non-SBFD symbols, scheduled and configured transport blocks over multiple slots (TBoMS) across SBFD symbols and non-SBFD symbols with or without repetition, multi-PUSCH and multi-PDSCH scheduled by a single downlink control information (DCI) message in SBFD symbols and non-SBFD symbols, scheduled and configured PDSCH, PUSCH, and PUCCH transmissions with repetitions across SBFD symbols and non-SBFD symbols. Further, inter-slot, intra-slot, inter-repetition, and inter-group frequency hopping with demodulation reference signal (DMRS) bundling of PUSCH and PUCCH transmissions, if applicable, may be considered in such studies and enhancements. Some examples of potential enhancements may include resource allocation in the frequency domain that includes frequency hopping, resource allocation in time domain, power domain enhancements, spatial domain enhancements, or the like. Further studies may be conducted to determine if the PUCCH, PUSCH, PDSCH, and PDCCH transmissions may be mapped to SBFD and non-SBFD in the same slot, if configured.

In some examples, the UE 115 may transmit a CSI report to the network entity 105. As such, for a transmission occasion of a single CSI report, an uplink resource may be provided by a resource list (e.g., a pucch-CSI-ResourceList). The resource list may be included in (e.g., defined in) a periodic or semi-persistent CSI report configuration. For a transmission occasion of multiple CSI reports, corresponding uplink resources may be provided by a list including multiple PUCCH configurations (e.g., multi-CSI-PUCCH-ResourceList), where such a list may be defined in CSI report configuration. As such, if a UE 115 receives a single uplink resource set for transmission of hybrid automatic repeat request (HARQ) acknowledgment (HARQ-ACK) information in response to a PDSCH reception that is scheduled by a DCI format or in response to a semi-persistently scheduled PDSCH release, the UE 115 may not expect to receive simultaneous HARQ-ACK CSI. Further, a UE 115 may be configured with a coding rate (e.g., maxCodeRate) for multiplexing HARQ-ACK, scheduling request, and CSI reports in a PUCCH transmission using PUCCH format 2, PUCCH format 3, or PUCCH format 4. If the UE 115 transmits CSI reports using PUCCH format 2, the UE transmits only wideband CSI for each CSI report.

For PUCCH format 2, the UE 115 may jointly encode the HARQ-ACK, scheduling request, and CSI bits in the PUCCH transmission. The quantity of CSI bits from the CSI report that can be appended to the HARQ-ACK and scheduling request bits may be in accordance with a standards body (e.g., such as 3rd generation partnership project (3GPP) standards). The quantity of uplink control information (UCI) bits appended by a cyclic redundancy check (CRC) may be encoded with a code rate that does not exceed the configured code rate (e.g., maxCodeRate). If the coding rate exceeds the configured code rate for PUCCH Format 2, the UE 115 may drop the CSI bits using the same priority rules for CSI omission as for CSI on PUSCH. Further, for PUCCH formats 3 and 4, the UE 115 may simultaneously transmit the HARQ-ACK, scheduling request, and CSI in accordance with a RRC configuration. As such, the HARQ-ACK, scheduling request, and bits of the first part CSI bits may be jointly encoded. In such examples, the UE 115 may separately include the bits of the second part CSI. The HARQ-ACK, scheduling request, and bits of the first part CSI bits may be jointly encoded with the configured code rate of the PUCCH Format 3 or 4. The remaining resources, if any, in the configured physical resource blocks may be used for encoding of the second part CSI report. As such, some, or all the bits of the second part CSI may be dropped using the same priority rules for CSI omission as for CSI on PUSCH.

In some examples, the UE 115 may use an SBFD slot to transmit one or more uplink messages to the network entity 105 and simultaneously receive one or more downlink messages from the network entity 105. Such SBFD slots may include frequency resources for both downlink and uplink communications, where a first portion of the SBFD slot is allocated for the downlink communications (e.g., an upper frequency range and lower frequency range are allocated for downlink communications) and a second portion of the SBFD slot is allocated for the uplink communications (e.g., the frequency range between the upper and lower frequency ranges for downlink communications). Further, in such slots, there may be one or more frequency resources that separate the uplink communications and downlink communications. This portion may be referred to as a guard band. In some cases, however, while performing the full duplex communications in SBFD slots, a PUCCH transmission (e.g., including a CSI report), may overlap with the first portion of the SBFD slots (e.g., the downlink portion) or overlap with the guard band. In such cases, the PUCCH transmission may interfere with the downlink communications, resulting in communication interference or dropped transmissions. As such, the network entity 105 may not receive the PUCCH transmission that includes the CSI report, resulting in increased latency, degraded channel quality, or both.

The techniques, methods, and devices described herein may provide for a configuration of uplink resources for CSI reporting in SBFD slots. In some examples, the UE 115 may receive a CSI report configuration indicating a first uplink resource for full-duplex slot types (e.g., SBFD slots) and a second uplink resource for half-duplex slot types. The UE 115 may monitor for a reference signal in order to generate the CSI report and transmit the PUCCH transmission, including the CSI report, via an uplink resource that corresponds to either the first uplink resource or second uplink resource. That is, the UE 115 may select either the first uplink resource or second uplink resource to use for CSI reporting based on a type of transmission slot for reporting the CSI. In some other examples, the UE 115 may adapt the uplink resource used for transmission of the CSI report to fit entirely within an uplink subband of a full-duplex slot. For example, the UE 115 may reduce, or otherwise drop, portions of the CSI report based on a quantity of resource elements in the adapted uplink resource, such that the CSI report transmission may not overlap with the downlink subband or guard band of full-duplex slots. In this way, the UE 115 may transmit the CSI report via the uplink subband of the full-duplex slot, resulting in less interference.

Figure 2:
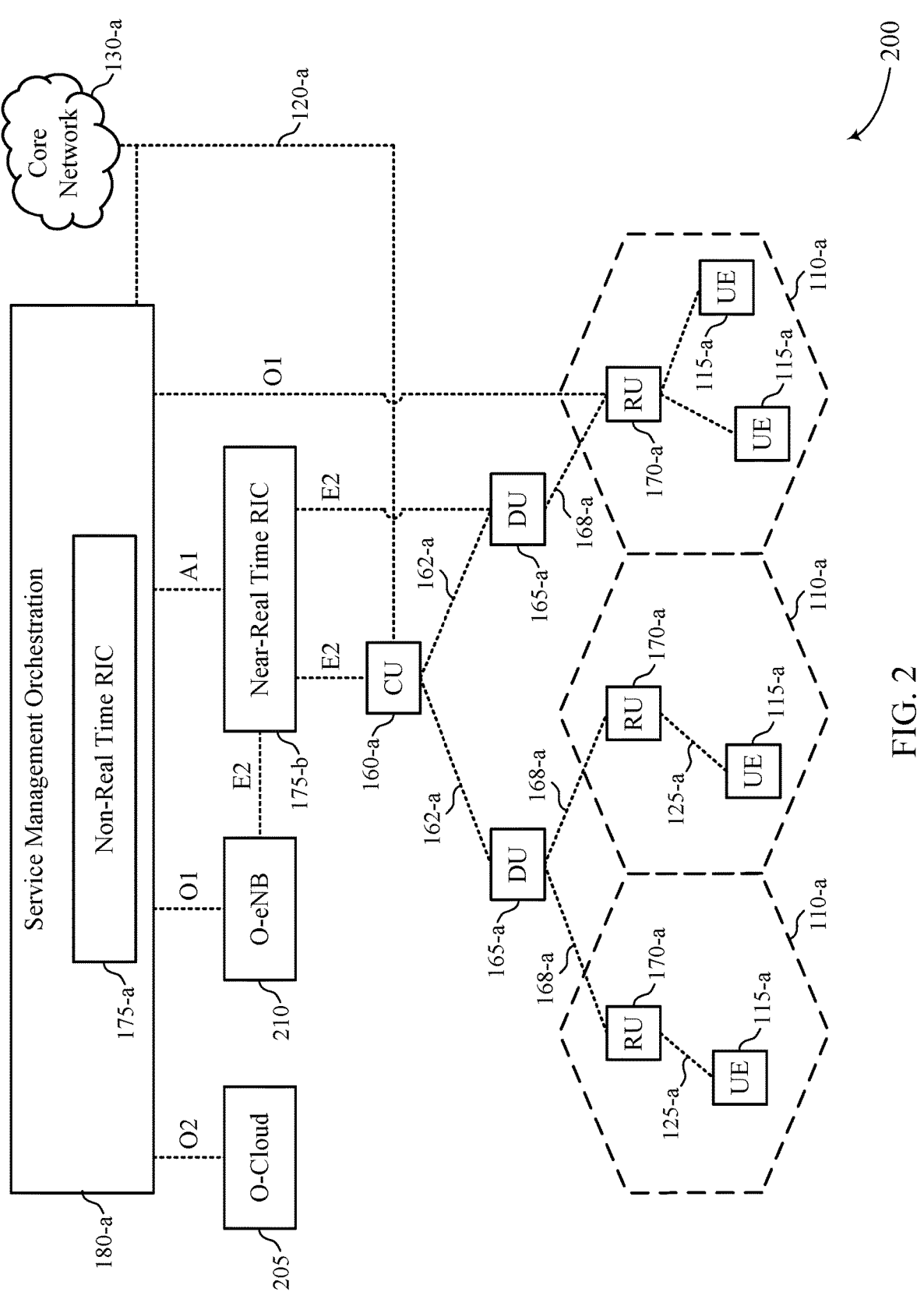
FIG. 2 illustrates an example of a network architecture that supports efficient full-duplex CSI reporting in accordance with one or more aspects of the present disclosure.

FIG. 2 illustrates an example of a network architecture 200 (e.g., a disaggregated base station architecture, a disaggregated RAN architecture) that supports efficient full-duplex CSI reporting in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an A1 interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via O1) or via generation of RAN management policies (e.g., A1 policies).

In some examples, the UE 115-a may communicate with the core network 130-a via full-duplex communications. For example, the UE 115-a may transmit one or more uplink messages to one or more RUs 170-a, while simultaneously receiving one or more downlink messages from the one or more RUs 170-a. To facilitate such communications, the Rus 170-a and the UE 115-a may use SBFD slots, where a first portion of the SBFD slot is allocated for downlink communications (e.g., an upper frequency range and lower frequency range are allocated for downlink communications) and a second portion of the SBFD slot is allocated for uplink communications (e.g., the frequency range between the upper and lower frequency ranges for downlink communications). Further, in such slots, there may be one or more frequency resources that separate the uplink communications and downlink communications. This portion may be referred to as a guard band. In some cases, however, while performing the full duplex communications, a PUCCH transmission (e.g., including a CSI report), may overlap with the first portion of the SBFD slots (e.g., the downlink portion) or overlap with the guard band. In such cases, the PUCCH transmission may interfere with the downlink communications, resulting in communication interference or dropped transmissions. As such, the RUs 170-a may not receive the PUCCH transmission that includes the CSI report, resulting in increased latency, degraded channel quality, or both.

The techniques, methods, and devices described herein may provide for a configuration of uplink resources for CSI reporting in SBFD slots. In some examples, the UE 115-a may receive a CSI report configuration indicating a first uplink resource for full-duplex slot types (e.g., SBFD slots) and a second uplink resource for half-duplex slot types. The UE 115-a may monitor for a reference signal in order to generate the CSI report and transmit the CSI report via an uplink resource that corresponds to either the first uplink resource or second uplink resource. That is, the UE 115-a may select either the first uplink resource or second uplink resource to use for CSI reporting based on a type of transmission slot for reporting the CSI. In some other examples, the UE 115-a may adapt the uplink resource used for transmission of the CSI report to fit entirely within an uplink subband of a full-duplex slot. For example, the UE 115-a may reduce, or otherwise drop, portions of the CSI report based on a quantity of resource elements in the adapted uplink resource, such that the CSI report transmission may not overlap with the downlink subband or guard band of full-duplex slots. In this way, the UE 115-a may transmit the CSI report via the uplink subband of the full-duplex slot, resulting in less interference.

Figure 3:
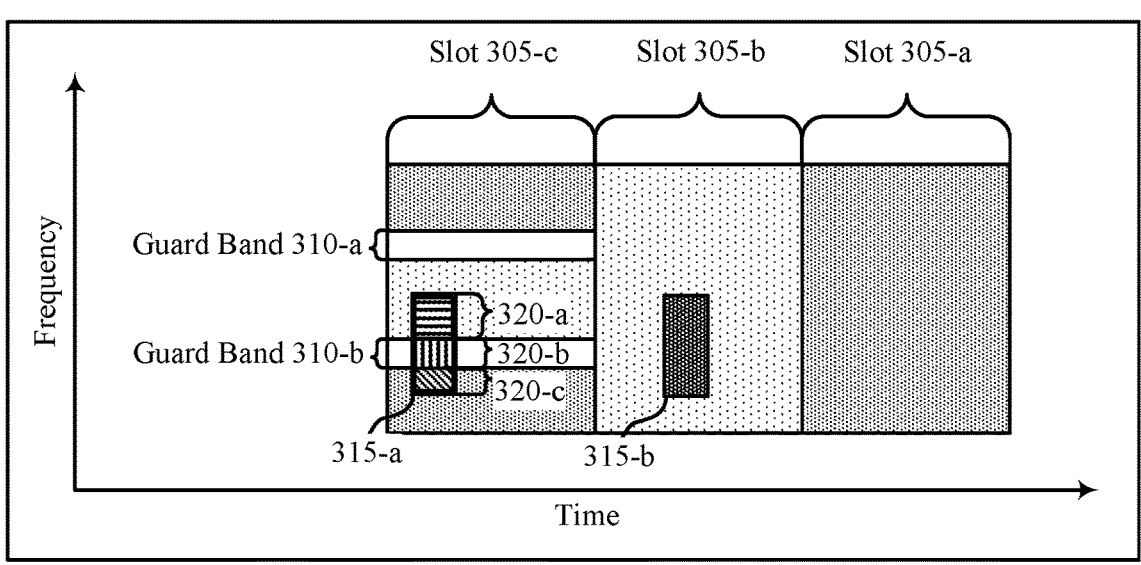
FIG. 3 illustrates an example of a wireless communications system that supports efficient full-duplex CSI reporting in accordance with one or more aspects of the present disclosure.
Figure 3:
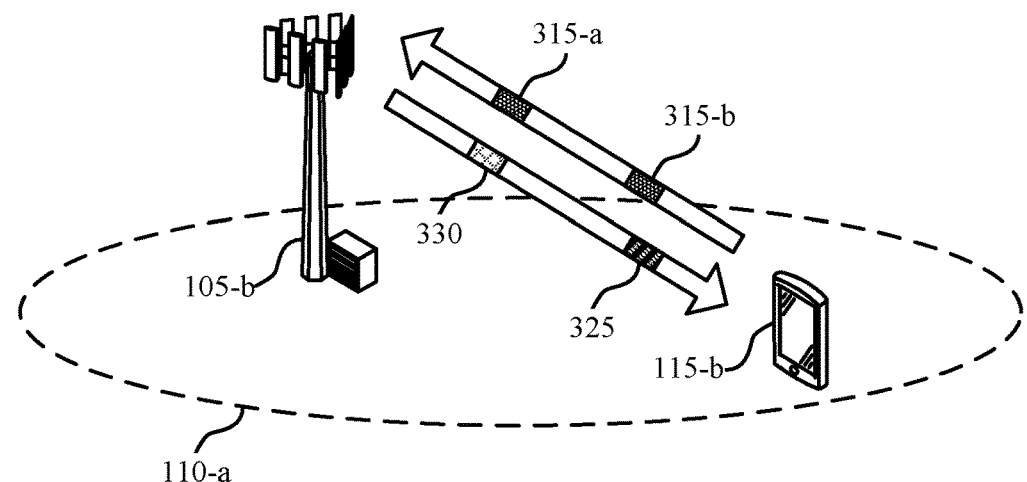
Figure 3:
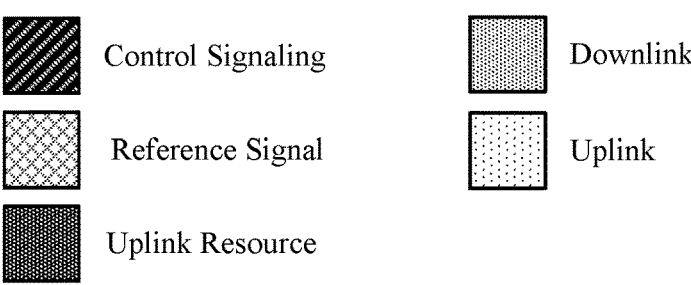

FIG. 3 illustrates an example of a wireless communications system 300 that supports efficient full-duplex CSI reporting in accordance with one or more aspects of the present disclosure. The wireless communications system 300 may implement, or be implemented by, aspects of the wireless communications system 100 and the network architecture 200 as described herein. For example, the wireless communications system 300 may include a network entity **105-*b* and a UE 115-*b*, which may be examples of corresponding devices described herein with reference to FIGS. 1 and 2**.

In some cases, the UE **115-*b* and the network entity 105-*b* may communicate using half-duplex communications or full-duplex communications via a slot pattern, which may include one or more slots 305 (e.g., where each slot may include 7 or 14 symbols). To perform half-duplex communications, the network entity 105-*b* may transmit, via a resource grant, an indication of respective time and frequency resources for a downlink slot 305-*a* and an uplink slot 305-*b*. As such, the UE 115-*b* may monitor the time and frequency resources associated with the downlink slot 305-*a* and receive one or more downlink messages. Likewise, the UE 115-*b* may transmit one or more uplink messages via the time and frequency resources in the uplink slot 305-*b***.

To perform full-duplex communications, the network entity **105-*b* may allocate respective time and frequency resources for both uplink and downlink communications in a slot 305-*c*, which may be referred to as an SBFD slot, a full-duplex slot, or the like. That is, the network entity 105-*b* may allocate a first portion of the slot 305-*a* (e.g., the upper and lower frequency ranges) for downlink resources, where such a portion of the slot 305-*c* may be referred to as the downlink subband of the slot 305-*c*. The network entity 105-*b* may also allocate a second portion of the slot 305-*c* (e.g., the frequency range in between the first portion) for uplink resources (e.g., uplink resources), where such a portion may be referred to as the uplink subband of the slot 305-*c*. Further, the network entity 105-*b* may allocate portions of frequency to separate the uplink and downlink subbands in the slot 305-*c*. For example, the network entity 105-*b* may allocate a guard band 310-*a* between the upper downlink subband and the uplink subband of the slot 305-*c*. Likewise, the network entity 105-*b* may allocate a guard band 310-*b* between the uplink subband and lower downlink subband of the slot 305-*c*. Such guard bands 310** may decrease the likelihood of transmission interference between uplink and downlink communications by further separating the uplink and downlink subbands.

In such cases, the UE **115-*b* may transmit UCI, via a first uplink resource 315-*a*, in the slot 305-*c* or transmit the UCI, via a second uplink resource 315-*b*, in the slot 305-*b***. Such UCI information may be referred to as a PUCCH transmission and include CSI reports, scheduling requests, HARQ-ACK information, or the like.

In some cases, however, the first uplink resource **315-*a*, allocated for the slot 305-*a*, may overlap with the guard bands 310 or downlink resources, which may result in interference between one or more downlink transmissions and transmission using the first uplink resource 315-*a*. For example, the UE 115-*b* may transmit a PUCCH transmission, via the first uplink resource 315-*a* in the slot 305-*c*, where a first portion 320-*a* of the first uplink resource 315-*a* may be within the uplink subband of the slot 305-*c*, while a second portion 320-*b* of the first uplink resource 315-*a* may overlap with the guard band 310-*b* and a third portion 320-*c* of the first uplink resource 315-*a* may overlap with the downlink subband of the slot 305-*c*. As such, the network entity 105-*b* may not receive and decode all of the information carried in the first uplink resource 315-*a* or experience interference between uplink and downlink communications, resulting in degraded communications and loss of data. Further, if the first uplink resource 315-*a* includes a CSI report, the UE 115-*b* may not have mechanisms in order to handle CSI reporting via the first uplink resource 315-*a*** in such cases.

The techniques, methods, and devices described herein may cover design aspects for periodic or semi-persistent CSI reporting on the first uplink resource **315-*a* in the slot 305-*c* (e.g., in the SBFD slot). Such design aspects may include determination of the first uplink resource 315-*a* for periodic and semi-persistent CSI reporting in the slot 305-*c* (e.g., SBFD slots) relative to the second uplink resource 315-*b* in the slot 305-*b*, used for half-duplex communications. Further, the design aspects may include reporting CSI on an adapted first uplink resource 315-*a* using partial allocation, such that the adapted first uplink resource 315-*a* fits within the uplink subband of the slot 305-*c***.

In some examples, the UE **115-*b* may transmit a single CSI report via an uplink resource 315 (e.g., either the first uplink resource 315-*a* or the second uplink resource 315-*b*) based on a transmission slot type. For example, the network entity 105-*b* may transmit control signaling 325 that includes a periodic or semi-persistent CSI report configuration. The CSI report configuration may include a resource list (e.g., pucch-CSI-ResourceList) that indicates an uplink resource 315 for the transmission of a single CSI report. That is, the network entity 105-*b* may provide, via at least one reporting configuration in the control signaling 325, a CSI report configuration indicating an uplink resource 315** to be used for transmission of the CSI report.

As such, if the UE **115-*b* is configured, via the control signaling 325, with a full-duplex slot reporting configuration (e.g., SBFD-specific PUCCH config), then a resource identifier (e.g., PUCCH identifier or PUCCH-ResourceID) of the uplink resource 315 (e.g., PUCCH-CSI-Resource) indicated in the resource list (e.g., pucch-CSI-ResourceList) may refer to the first uplink resource 315-*a* defined under a full-duplex slot reporting configuration (e.g., PUCCH-config-SBFD) if the transmission slot is a full-duplex slot type, otherwise the resource identifier may refer to the second uplink resource 315-*b*** in a half-duplex slot reporting configuration (e.g., PUCCH-config).

For example, the UE **115-*b* may receive the control signaling 325, where the control signaling 325 may include the CSI report configuration, the full-duplex slot reporting configuration (e.g., PUCCH-Config-SBFD), the half-duplex slot reporting configuration (PUCCH-Config), or a combination thereof. The full-duplex slot reporting configuration may include one or more uplink resources 315 that correspond to the uplink subband in the slot 305-*c*. For example, the full-duplex slot reporting configuration may include the first uplink resource 315-*a*, where the first uplink resource 315-*a* fits in the uplink subband of the slot 305-*c*. The half-duplex reporting configuration may include one or more uplink resources 315 that correspond to the slot 305-*b*, such as the second uplink resource 315-*b*. The CSI report configuration may include a resource list (e.g., pucch-CSI-ResourceList) that indicates an uplink resource 315** (e.g., PUCCH-CSI-Resource) with an associated resource identifier (e.g., PUCCH-ResourceID).

As such, based on the slot type of a slot in which the transmission of the CSI report is to occur, the resource identifier (e.g., PUCCH identifier) may be associated with the first uplink resource **315-*a* in the full-duplex reporting configuration or with the second uplink resource 315-*b* in the half-duplex reporting configuration. As an illustrative example, the network entity 105-*b* may indicate, via control signaling 325, that the transmission of the CSI report is to occur in the slot 305-*c*** (e.g., SBFD slot). As such, the UE 115-*b* may use the first uplink resource 315-*a* from the full-duplex reporting configuration to transmit the CSI report, where the first uplink resource 315-*a* of the full-duplex reporting configuration is identified based on the resource identifier indicated in the resource list of the CSI report configuration. Alternatively, if the network entity 105-*b* indicates that the transmission of the CSI report is to occur in the slot 305-*b*, then the UE 115-*b* may use the second uplink resource 315-*b* from the half-duplex reporting configuration for the transmission of the CSI report, where the second uplink resource 315-*b* of the half-duplex reporting configuration is identified based on the resource identifier indicated in the resource list of the CSI report configuration.

In some other examples, in order to transmit the single CSI via an uplink resource 315 (e.g., either the first uplink resource 315-*a* or the second uplink resource 315-*b*), the network entity 105-*b* may configure, under a CSI report configuration indicated in the control signaling 325, a first list of one or more uplink resources 315 associated with the slot 305-*c* (e.g., an SBFD specific pucch-CSI-ResourceList). That is, under the CSI report configuration, the network entity 105-*b* may configure the UE 115-*b* with the first list of one or more uplink resources 315 associated with the slot 305-*c* (e.g., the SBFD specific pucch-CSI-ResourceList), which may include one or more uplink resource 315, and associated uplink resource identifiers, for SBFD slots (e.g., such as the slot 305-*c*). Additionally, for half-duplex slots (e.g., such as the slot 305-*b*), the network entity 105-*b* may include, in the CSI report configuration, a second list of one or more uplink resources 315 (e.g., pucch-CSI-ResourceList) to use for the transmission of the CSI report (e.g., PUCCH transmission that includes the CSI report).

For example, the network entity 105-*b* may transmit, via at least on reporting configuration in the control signaling 325, a CSI-ReportConfig that includes the first and second lists of one or more uplink resources 315, such as a pucch-CSI-ResourceList and a pucch-CSI-ResourceList-SBFD, respectively, as illustrated below:

network entity 105-*b* may indicate, via the control signaling 325, that the transmission of the CSI report is to occur in the slot 305-*c*. In such examples, the UE 115-*b* may select and use the first uplink resource 315-*a* from the first list of one or more uplink resources 315 for the CSI report transmission. Alternatively, the network entity 105-*b* may indicate, via control signaling 325, that the transmission of the CSI report is occur in the slot 305-*b*. In such examples, the UE 115-*b* may select and use the second uplink resource 315-*b* from the second list of one or more uplink resources 315 in order to transmit the CSI report.

In some other examples, in order to transmit the single CSI report via an uplink resource 315 (e.g., either the first uplink resource 315-*a* or the second uplink resource 315-*b*), the network entity 105-*b* may configure, under a resource list (e.g., pucch-CSI-ResourceList) in a CSI report configuration, the UE 115-*b* with a respective uplink resource 315 (e.g., an SBFD specific uplink resource) for the CSI report transmission (e.g., PUCCH transmission). That is, under an uplink resource parameter (e.g., PUCCH-CSI-Resource) of the CSI report configuration, the network entity 105-*b* may configure a first resource identifier (e.g., PUCCH-ResourceId) for the second uplink resource 315-*b* (e.g., pucch-Resource) to be used in the slot 305-*b* and a second resource identifier (e.g., PUCCH-ResourceId) for the first uplink resource 315-*a* (e.g., pucch-Resource-SBFD) to be used in the slot 305-*c*.

That is, the network entity 105-*b* may include, in at least one reporting configuration of the control signaling 325, the uplink resource parameter (e.g., PUCCH-CSI-Resource) in a CSI report configuration (e.g., CSI-ReportConfig), as illustrated below:

| PUCCH-CSI-Resource ::= | SEQUENCE { |
| uplinkBandwidthPartId | BWP-Id, |
| pucch-Resource | PUCCH-ResourceId |
| } pucch-Resource-SBFD | PUCCH-ResourceId |

```
CSI-ReportConfig ::=              SEQUENCE {
    reportConfigId                   CSI-ReportConfigId,
    carrier                       ServCellIndex
OPTIONAL,   -- Need S
    resourcesForChannelMeasurement   CSI-ResourceConfigId,
    csi-IM-ResourcesForInterference  CSI-ResourceConfigId
OPTIONAL,   -- Need R
    nzp-CSI-RS-ResourcesForInterference   CSI-ResourceConfigId
OPTIONAL,   -- Need R
    reportConfigType                     CHOICE {
        periodic                         SEQUENCE {
            reportSlotConfig                 CSI-ReportPeriodicityAndOffset,
            pucch-CSI-ResourceList               SEQUENCE (SIZE (1.. maxNrofBWPs)) OF PUCCH-
CSI-Resource
        }, pucch-CSI-ResourceList-SBFD            SEQUENCE (SIZE ( 1.. maxNrofBWPs))
OF PUCCH-CSI-Resource
```

For example, the UE 115-*b* may receive the control signaling 325 indicating both the first list of one or more uplink resources 315 for full-duplex slots (e.g., pucch-CSI-ResourceList-SBFD), which includes the first uplink resource 315-*a*, and the second list of one or more uplink resources for half-duplex slots (e.g., pucch-CSI-Re-sourceList), which includes the second uplink resource 315-*b*. As such, based on the slot type for transmission of the CSI report, the UE 115-*b* may select and use an uplink resource 315 (e.g., the first uplink resource 315-*a* or the second uplink resource 315-*b*) from either the first or second lists of uplink resources 315. As an illustrative example, the The resource identifiers of the respective uplink resources 315 in the control signaling 325 may correspond to uplink resources 315 for the associated uplink BWP. As such, the uplink resource of format 2, 3, and 4 may be supported. The uplink resources 315 corresponding to the resource identifiers may be configured via respective PUCCH configurations in the control signaling 325 (e.g., a PUCCH-Config for half duplex slots and a PUCCH-Config-SBFD for SBFD slots) and referred to by the respective resource identifiers. As such, when two PUCCH configurations are configured within a PUCCH configuration list (e.g., PUCCH-ConfigurationList), the resource identifiers of the uplink resources 315 (e.g., in the PUCCH-CSI-Resource) may refer to an uplink resource 315 in the PUCCH configuration used for HARQ-ACK with low priority.

For example, the UE 115-b may receive control signaling 325, that includes a CSI report configuration, an uplink resource configuration for half-duplex slots, and an uplink resource configuration for full-duplex slots. The CSI report configuration may include an uplink resource parameter (e.g., PUCCH-CSI-Resource) that includes a resource identifier (e.g., PUCCH-ResourceId) for the second uplink resource 315-b for half-duplex slots (e.g., pucch-Resource) and a resource identifier for the first uplink resource 315-a for full-duplex slots (e.g., pucch-Resource-SBFD). That is, the resource identifier for full-duplex slots may correspond to the first uplink resource 315-a in the PUCCH configuration for full-duplex slots, while the resource identifier for half-duplex slots may correspond to the second uplink resource 315-b. As such, based on the slot type for the CSI report transmission, the UE 115-b may select and use an uplink resource 315 out of either the PUCCH configuration for half-duplex slots or the PUCCH configuration for full-duplex slots, where the uplink resource 315 corresponds to the indicated resource identifier in the CSI report configuration. As an illustrative example, the network entity 105-b may indicate, via control signaling 325, that the CSI report transmission is to occur in the slot 305-c. As such, the UE 115-b may use the first uplink resource 315-a for the transmission of the CSI report, where the first uplink resource 315-a is identified based on the resource identifier (e.g., PUCCH-ResourceId) indicated in the CSI report configuration (e.g., pucch-Resource-SBFD). Alternatively, the network entity 105-b may indicate, via control signaling 325, that the CSI report transmission is to occur in the slot 305-b. In such examples, the UE 115-b may use the second uplink resource 315-b for transmission of the CSI report, where the second uplink resource 315-b is identified based on the resource identifier (e.g., PUCCH-ResourceId) indicated in the CSI report configuration (e.g., pucch-Resource-SBFD).

In some examples, no dedicated uplink resources 315 may be available for transmitting a single CSI report in the slot 305-c (e.g., SBFD slots). That is, the network entity 105-b may not configure the UE 115-b with multiple uplink resources 315, where each uplink resource 315 is for a respective slot type. As such, in one example, the UE 115-b may adapt the first uplink resource 315-a to fit within the uplink subband of the slot 305-c, such that the CSI report is transmitted on the adapted first uplink resource 315-a (e.g., transmit the CSI report via resources in the uplink subband of the SBFD of slot 305-c). In another example, the UE 115-b may drop the transmission of the CSI report in cases where the first uplink resource 315-a at least partially overlaps with the downlink subbands or guard bands 310 of the slot 305-c. That is, if the second portion 320-b and third portion 320-c of the first uplink resource 315-a overlap with the guard band 310-b and the downlink subband of the slot 305-c, respectively, then the UE 115-b may drop the respective occurrence of the CSI report transmission.

In the example of a single CSI report on a partial uplink resource 315, the UE 115-b may adapt the first uplink resource 315-a to fit in the uplink subband of the slot 305-c (e.g., the SBFD slot). For example, the UE 115-b may shift or reduce the quantity of resource elements of the first uplink resource 315-a in the frequency domain, use the same or increased quantity of symbols in the time domain, or a combination thereof, in order to adapt the first uplink resource 315-a to fit within the uplink subband of the slot 305-c. In such examples, the quantity of resource elements in the first uplink resource 315-a may be the same or different between the slot 305-c and the slot 305-b (e.g., between SBFD and half-duplex slots). As an illustrative example, the UE 115-b may reduce, or otherwise drop, the resource elements associated with the second portion 320-b and the third portion 320-c of the first uplink resource 315-a, such that the first uplink resource 315-a includes the first portion 320-a that fits entirely within the uplink subband of the slot 305-c.

As such, if the UE 115-b adapts the first uplink resource 315-a such that the quantity of resource elements is reduced (e.g., the second portion 320-b and the third portion 320-c are dropped), then the UE 115-b may transmit a wideband CSI report using formats 2, 3, or 4, via the first portion 320-a of the first uplink resource 315-a. Alternatively, based on the quantity of resource elements available in the first portion 320-a of the first uplink resource 315-a, the UE 115-b may drop the CSI report from the first uplink resource 315-a, transmit a wideband CSI report via the first uplink resource 315-a, or transmit a wideband and subband CSI report via the first uplink resource 315-a. That is, the UE 115-b may compare the payload associated with the first uplink resource 315-a with the size of the first portion 320-a of the first uplink resource 315-a in order to determine whether the CSI report is dropped, reduced, or fully transmitted. For example, the UE 115-b may drop the CSI report if the quantity of resource elements of the first portion 320-a of the first uplink resource 315-a is less than the quantity of bits for transmission of a first part CSI report via the first uplink resource 315-a in accordance with equation 1:

$$(O_{ACK} + O_{SR} + O_{CSI-part1} + O_{CRC,CSI-part1}) > \tag{1}$$
$$M_{RB}^{PUCCH} * M_{sc,ctrl}^{RB} * M_{symb-UCI}^{PUCCH} * Q_m * r$$

$O_{ACK}$ may represent the quantity of HARQ-ACK bits in the payload associated with the first uplink resource 315-a, $O_{SR}$ may represent the quantity of scheduling request bits associated with the payload of the first uplink resource 315-a, $O_{CSI-part1}$ may represent the quantity of bits associated with the payload of the uplink resource 315 that are for a first part CSI report, and $O_{CRC,CSI-part1}$ may represent the quantity of bits associated with the payload of the first uplink resource 315-a that are for CRC for the first part CSI report.

$$M_{RB}^{PUCCH}$$

may represent the quantity of resource elements (e.g., otherwise known as resource blocks (RBs)) available in the first portion 320-a of the first uplink resource 315-a (e.g., after being adapted or reduced), $$M_{sc,ctrl}^{RB}$$

may represent the quantity of resource elements available for control information in the first portion 320-a of the first uplink resource 315-a.

$$M_{symb-UCI}^{PUCCH}$$

may represent the quantity of symbols in the first portion 320-*a* of the first uplink resource 315-*a*, $Q_m$ may represent the modulation scheme of the first uplink resource 315-*a*, and r may represent the coding rate of the first uplink resource 315-*a*.

Alternatively, the UE 115-*b* may transmit wideband CSI report via the first portion 320-*a* of the first uplink resource 315-*a* in cases when the quantity of resource elements of the first portion 320-*a* of the first uplink resource 315-*a* is greater than or equal to the quantity of bits for transmission of a first part CSI report via the first uplink resource 315-*a* in accordance with equation 2:

$$(O_{ACK} + O_{SR} + O_{CSI-part1} + O_{CRC,CSI-part1}) \leq \tag{2}$$
$$M_{RB}^{PUCCH} * M_{sc,ctrl}^{RB} * M_{symb-UCI}^{PUCCH} * Q_m * r$$

Further, the UE 115-*b* may transmit a wideband and subband CSI report if the quantity of resource elements in the first portion 320-*a* of the first uplink resource 315-*a* is greater than or equal to the quantity of bits for transmission of a wideband and subband CSI report (e.g., both first and second part CSI report) via the uplink resource 315—in accordance with equation 3:

$$(O_{ACK} + O_{SR} + O_{CSI} + O_{CRC}) \leq M_{RB}^{PUCCH} * M_{sc,ctrl}^{RB} * M_{symb-UCI}^{PUCCH} * Q_m * r \tag{3}$$

Where $O_{CSI}$ may represent the quantity of bits associated with the payload of the first uplink resource 315-*a* that are for wideband and subband CSI report and $O_{CRC}$ may represent the quantity of bits associated with the payload of the first uplink resource 315-*a* that are for CRC for the wideband and subband CSI report.

As an illustrative example, the UE 115-*b* may receive, via control signaling 325, a CSI report configuration indicating the first uplink resource 315-*a* associated with the slot 305-*c*, where the second portion 320-*b* and the third portion 320-*c* of the first uplink resource 315-*a* may overlap with the guard band 310-*b* and the downlink subband of the slot 305-*c*. In one example, the UE 115-*b* may refrain from transmitting the CSI report via the first uplink resource 315-*a* based on the overlapping resources. In another example, the UE 115-*b* may adapt the first uplink resource 315-*a* to fit entirely within the uplink subband of the slot 305-*c*. That is, the UE 115-*b* may adapt the first uplink resource 315-*a* by reducing, or otherwise dropping, the resource elements associated with the second portion 320-*b* and the third portion 320-*c*, such that the first uplink resource 315-*a* includes the first portion 320-*a*.

In some examples, the UE 115-*b* may transmit a wideband CSI report via the first portion 320-*a* of the first uplink resource 315-*a* based on adapting the first uplink resource 315-*a*. In some other examples, the UE 115-*b* may compare the payload associated with the first uplink resource 315-*a* to the resource elements of the reduced or adapted first uplink resource 315-*a* using equations 1 through 3. Based on the comparison, the UE 115-*b* may refrain from transmitting the CSI report via the first portion 320-*a* of the first uplink resource 315-*a*, transmit a wideband CSI report via the first portion 320-*a* of the first uplink resource 315-*a*, or transmit a wideband and subband CSI report via the first portion 320-*a* of the uplink resource 315.

The techniques described herein may enable the UE 115-*b* to efficiently transmit a CSI report via the first uplink resource 315-*a* in the slot 305-*c* or via the second uplink resource 315-*b* in the slot 305-*b* based on the transmission slot type associated with the transmission of the CSI report, resulting in increased communication reliability and less interference in the slot 305-*c*. For example, the UE 115-*b* may receive control signaling 325 indicating the first uplink resource 315-*a* (e.g., a first uplink resource) for reporting the CSI in a full-duplex slot and the second uplink resource 315-*b* (e.g., a second uplink resource) for reporting the CSI in a half-duplex slot. Further, the control signaling 325 may include one or more time and frequency resources for a reference signal 330. As such, the UE 115-*b* may monitor for the reference signal 330, measure the reference signal 330, and generate the CSI report. The UE 115-*b* may transmit the CSI report, via the first uplink resource 315-*a* or the second uplink resource 315-*b*, in accordance with the techniques described herein.

Figure 4:
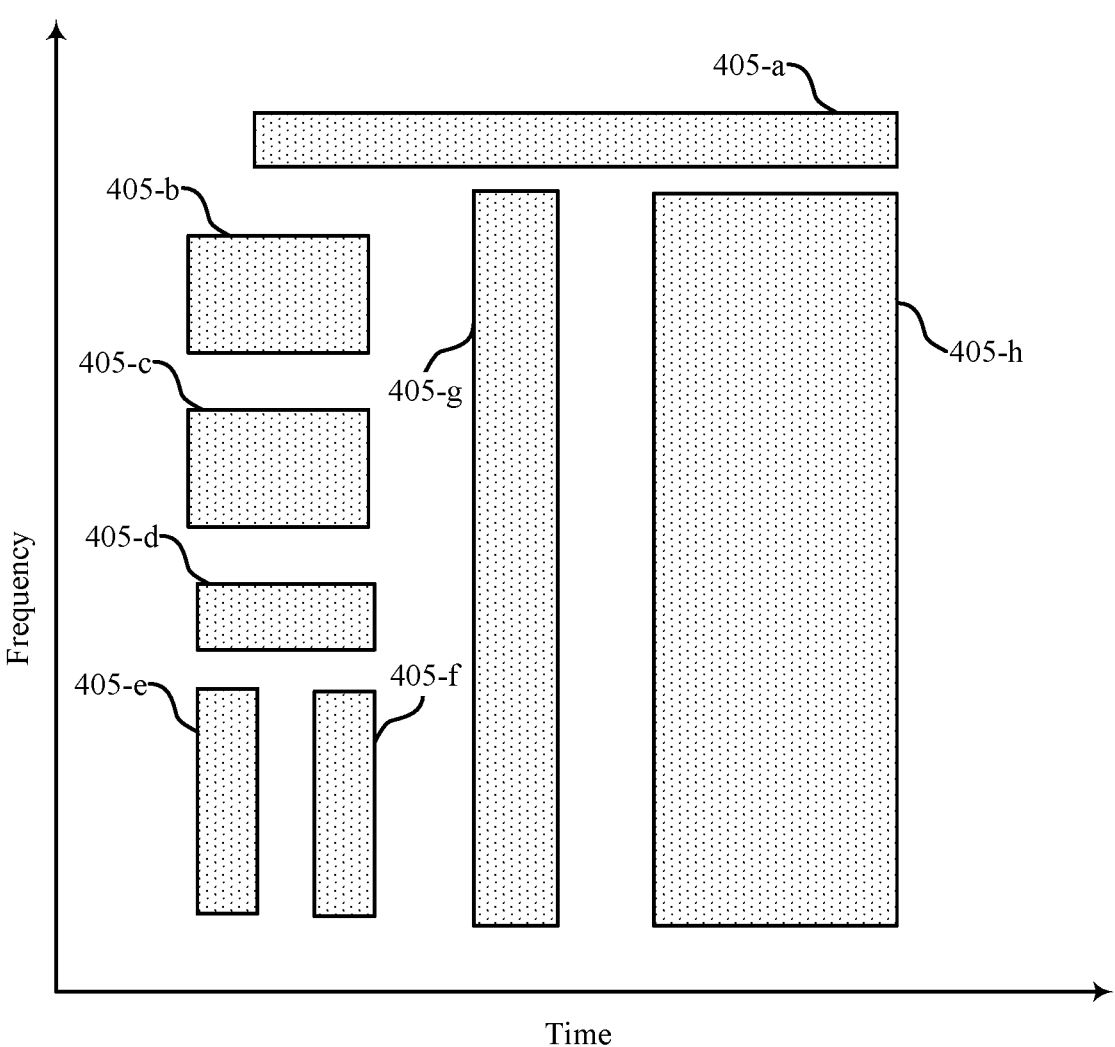
FIG. 4 illustrates an example of a resource diagram that supports efficient full-duplex CSI reporting in accordance with one or more aspects of the present disclosure.

FIG. 4 illustrates an example of a resource set 400 that supports efficient full-duplex CSI reporting in accordance with one or more aspects of the present disclosure. The resource set 400 may implement, or be implemented by, aspects of the wireless communications system 100, the network architecture 200, and the wireless communications system 300. For example, the resource set 400 may be an example of a PUCCH configuration for a PUCCH transmission (e.g., transmission of a CSI report) as described herein with reference to FIG. 3. The resource set 400 may be implemented by a network entity 105 and a UE 115, which may be examples of corresponding devices described herein.

In some examples, the network entity 105 may configure the UE 115 with up to four resource sets 400 (e.g., uplink resource sets, which may be referred to as PUCCH resource sets), where each resource set 400 may be configured with up to 16 uplink resources 405. Such uplink resources 405 may be examples of uplink resources 315 as described herein with reference to FIG. 3. Each uplink resource 405 may represent a quantity of time symbols multiplied by a quantity of frequency resources (e.g., M frequency tones or resource elements multiplied by N OFDM symbols). In such examples, the UE 115 may use one out of the four resource sets 400 for PUCCH transmissions based on a payload associated with the PUCCH transmission (e.g., the UCI). The network entity 105 may use three dedicated bits (e.g., uplink resource indicator (PRI)) in a DCI message and a one bit based first control channel element (CCE) index in order to indicate to the UE 115 to use one out of up to the 16 uplink resources 405 in a resource set 400.

For example, the resource set 400 may be an example of an uplink resource set configuration, which includes eight resources (e.g., uplink resource 405-*a*, uplink resource 405-*b*, uplink resource 405-*c*, uplink resource 405-*d*, uplink resource 405-*e*, uplink resource 405-*f*, uplink resource 405-*g*, and uplink resource 405-*h*). Each uplink resource 405 in the resource set 400 may correspond to a set of time resources (e.g., OFDM symbols) and frequency resources (e.g., resource elements). The UE 115 may use an uplink resource 405 out of the resource set 400 in order to report a single CSI in a PUCCH transmission in accordance with the techniques described herein.

In some examples, the resource set 400 may be an example of a full-duplex slot reporting configuration (e.g., PUCCH-Config-SBFD). In such examples, the UE 115 may receive, via control signaling, a CSI report configuration (e.g., CSI-ReportConfig), the resource set 400, and a half-duplex slot reporting configuration (e.g., a resource set for half-duplex communications or PUCCH-Config). In such examples, the CSI report configuration may include a resource list, where the resource list indicates an uplink resource (e.g., PUCCH-CSI-Resource) and corresponding resource identifier (e.g., PUCCH-ResourceID). Based on the slot type of the uplink resource 405 for the PUCCH transmission, the UE 115 may select and use an uplink resource 405 from either the resource set 400 (e.g., for full-duplex slots) or use an uplink resource from the half-duplex reporting configuration. As an illustrative example, the network entity 105 may indicate, in the CSI report configuration, a resource identifier associated with the uplink resource 405-*a*. As such, if the network entity 105 indicates the transmission slot of the PUCCH transmission is a full-duplex slot, the UE 115 may use the uplink resource 405-*a* for reporting the CSI in the PUCCH transmission accordingly.

In some other examples, the resource set 400 may be an example of a first list of one or more uplink resources for reporting a CSI report in the full-duplex slot type. In such examples, the UE 115 may receive, via control signaling, a CSI report configuration indicating the resource set 400 and a second list of one or more uplink resources for reporting a CSI report in a half-duplex slot type. As such, based on the transmission slot type of the PUCCH transmission, the UE 115 may select an uplink resource 405 from the resource set 400 or an uplink resource from the second list. As an illustrative example, if the transmission slot of the PUCCH transmission is a full-duplex slot type, then the UE 115 may select and use the uplink resource 405-*a* for reporting the CSI in the PUCCH transmission.

In some other examples, the resource set 400 may be an example of an uplink resource set for full-duplex slots (e.g., PUCCH-Config-SBFD). In such examples, the UE 115 may receive, via control signaling, the resource set 400, an uplink resource set for half-duplex slots (e.g., PUCCH-Config), and a CSI report configuration. In such examples, the CSI report configuration may include a list of resources (e.g., pucch-CSI-ResourceList) that indicates a resource identifier of one of the uplink resources 405 in the resource set 400 and a resource identifier of one of the uplink resources in the uplink resource set for half-duplex slots. As such, based on the transmission slot type of the PUCCH transmission, the UE 115 may select and use a resource of either the resource set 400 or the uplink resource set for half-duplex slots, where the resource corresponds to one of the respective resource identifiers. As an illustrative example, the UE 115 may receive an indication that the resource identifier associated with the resource set 400 corresponds to the uplink resource 405-*a*. Thus, if the transmission slot of the PUCCH transmission is a full-duplex slot type, the UE 115 may select and use the uplink resource 405-*a* in order to report the single CSI in the PUCCH transmission.

In some other examples, the resource set 400 may not be a dedicated uplink resource set for full-duplex slot types. As an illustrative example, the UE 115 may receive, via control signaling, a CSI report configuration indicating the uplink resource 405-*a* is to be used to report the CSI in the PUCCH transmission, where the uplink resource 405-*a* may overlap with the guard bands or downlink subbands of a full-duplex slot. In one example, the UE 115 may refrain from reporting the CSI in the PUCCH transmission based on the overlapping resources.

In another example, the UE 115 may adapt the uplink resource 405-*a* to fit entirely within the uplink subband of the full-duplex slot. As such, the UE 115 may transmit wideband CSI via the PUCCH transmission based on adapting the uplink resource 405. Additionally, or alternatively, the UE 115 may compare the payload of the PUCCH transmission to the resource elements of the reduced or adapted uplink resource 405-*a* using equations 1 through 3 as described herein with reference to FIG. 3. Based on the comparison, the UE 115 may refrain from transmitting the CSI report with the PUCCH transmission in the adapted uplink resource 405-*a*, transmit a wideband CSI report with the PUCCH transmission in the adapted uplink resource 405-*a*, or transmit a wideband and subband CSI report with the PUCCH transmission using the adapted uplink resource 405-*a*.

Figure 5:
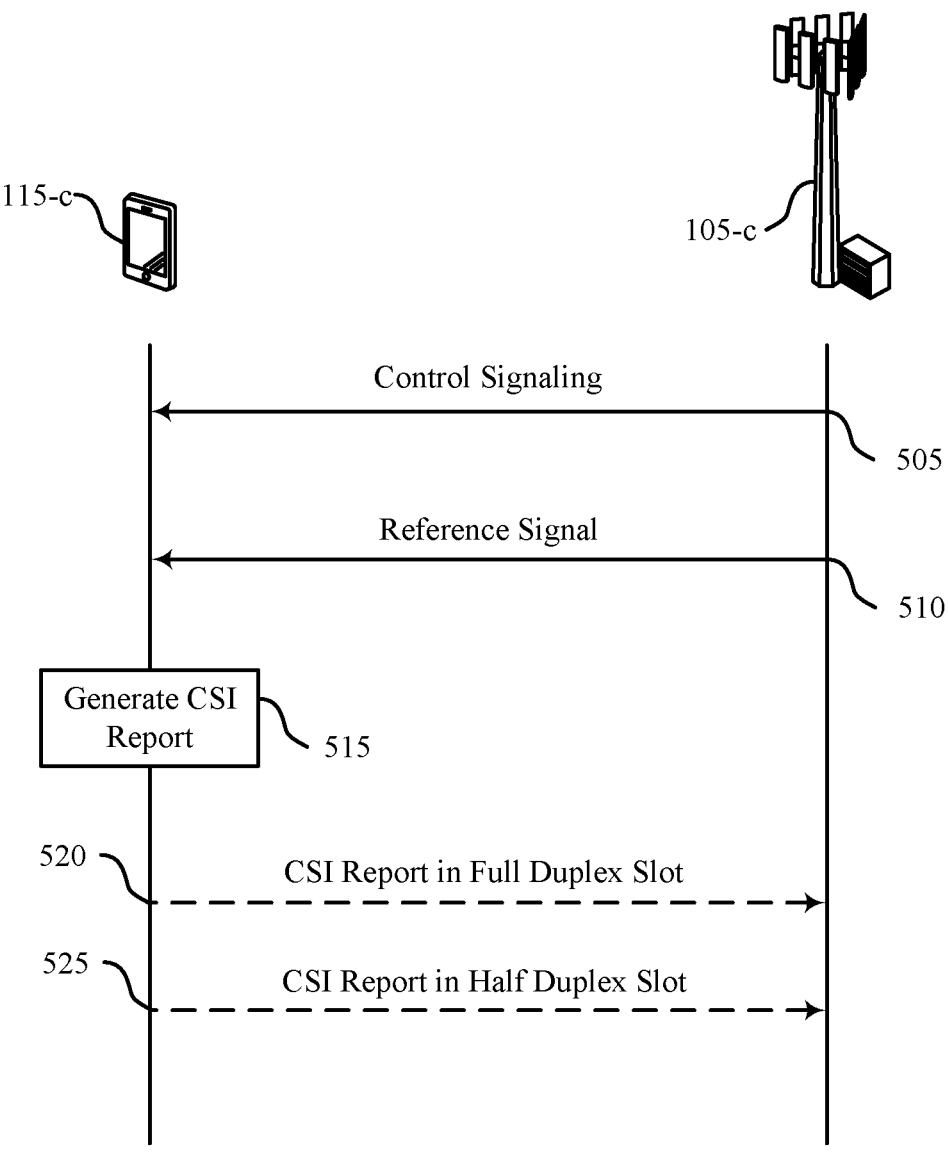
FIG. 5 illustrates an example of a process flow that supports efficient full-duplex CSI reporting in accordance with one or more aspects of the present disclosure.

FIG. 5 illustrates an example of a process flow 500 that supports efficient full-duplex CSI reporting in accordance with one or more aspects of the present disclosure. The process flow may implement, or be implemented by, aspects of the wireless communications system 100, the network architecture 200, the wireless communications system 300, and the resource set 400. For example, the process flow may be implemented by a UE 115-*c* and a network entity 105-*c*, which may be examples of corresponding devices as described herein with reference to FIGS. 1 through 4. In the following description of the process flow 500, the operations may be performed in a different order than the order shown. Specific operations also may be left out of the process flow 500, or other operations may be added to the process flow 500. Further, although some operations or signaling may be shown to occur at different times for discussion purposes, these operations may actually occur at the same time.

At 505, the UE 115-*c* may receive control signaling indicating at least one reporting configuration for a CSI report, where the at least one reporting configuration identifies a first uplink resource (e.g., a first uplink resource 315-*a*) for reporting a CSI report in a full-duplex slot type and a second uplink resource (e.g., a second uplink resource 315-*b*) for reporting the CSI report in a half-duplex slot. Further, the control signaling may include an indication of downlink resources for a reference signal, such as a CSI-RS, for measurement and generation of the CSI report. That is, the control signaling may indicate one or more time and frequency resources associated with one or more CSI-RSs that may be used to generate the CSI report.

In some examples, the at least on reporting configuration indicates a full-duplex slot reporting configuration (e.g., PUCCH-config-SBFD), a half-duplex slot reporting configuration (e.g., PUCCH-config), and a resource identifier (e.g., PUCCH-ResourceID), where the resource identifier identifies the uplink resource corresponding to one of the first uplink resource of the full-duplex slot reporting configuration or the second uplink resource of the half-duplex slot reporting configuration based on the slot type of the transmission slot of the uplink resource.

In some other examples, the at least one reporting configuration identifies a first list of one or more uplink resources for reporting the CSI report in the full-duplex slot type (e.g., pucch-CSI-ResourceList-SBFD) and a second list of one or more uplink resources for reporting the CSI report in the half-duplex slot type (e.g., pucch-CSI-ResourceList), where the first list of one or more uplink resources includes the first uplink resource and the second list of one or more uplink resources includes the second uplink resource.

In some other examples, the at least on reporting configuration identifies a first resource identifier (e.g., PUCCH-ResourceID) corresponding to the first uplink resource (e.g., pucch-Resource-SBFD) for reporting the CSI report in the full-duplex slot type and a second resource identifier (e.g., PUCCH-ResourceID) corresponding to the second uplink resource (e.g., pucch-Resource) for reporting the CSI report in a half-duplex slot type.

At 510, the UE 115-*c* may monitor the one or more time and frequency resources associated with the one or more reference signals. For example, the UE 115-*c* may monitor a reference signal resource to generate a measurement for the CSI report. At 515, in accordance with the measurements of the one or more reference signals, the UE 115-*c* may generate the CSI report.

At 520, the UE 115-*c* may optionally transmit a PUCCH transmission (e.g., such as UCI) including the CSI report via an uplink resource that corresponds to the first uplink resource based on the slot type of a transmission slot of the uplink resource being a full-duplex transmission slot. In some examples, the CSI report may include a wideband CSI and subband CSI based on a quantity of resource elements of the uplink resource, where the uplink resource includes a portion of the first uplink resource that is adapted to fit within an uplink subband of the transmission slot that is a full-duplex slot.

In some examples, the UE 115-*c* may transmit, via the uplink resource, a wideband CSI report based on the uplink resource that includes a portion of the first uplink resource that is adapted to fit within an uplink subband of the transmission slot that is a full-duplex slot. In some examples, the UE 115-*c* may transmit, via the uplink resource, a wideband CSI report based on the quantity of resource elements of the uplink resource, where the uplink resource includes a portion of the first uplink resource that is adapted to fit within an uplink subband of the transmission slot that is a full-duplex slot.

In some examples, the UE 115-*c* may refrain from transmitting a second CSI report via an occurrence of the uplink resource in a full-duplex slot based on the quantity of resource elements in the occurrence of the uplink resource in the full-duplex slot. Additionally, or alternatively, the UE 115-*c* may refrain from transmitting a second CSI report via an occurrence of the uplink resource in a full-duplex slot based on the occurrence of the uplink resource in the full-duplex slot at least partially overlapping with a down-link subband of the full-duplex slot, a guard band of the full-duplex slot, or both.

At 525, the UE 115-*c* may optionally transmit a PUCCH transmission including the CSI report via an uplink resource that corresponds to the second uplink resource based on a slot type of a transmission slot of the uplink resource being a half-duplex transmission slot.

Figure 6:
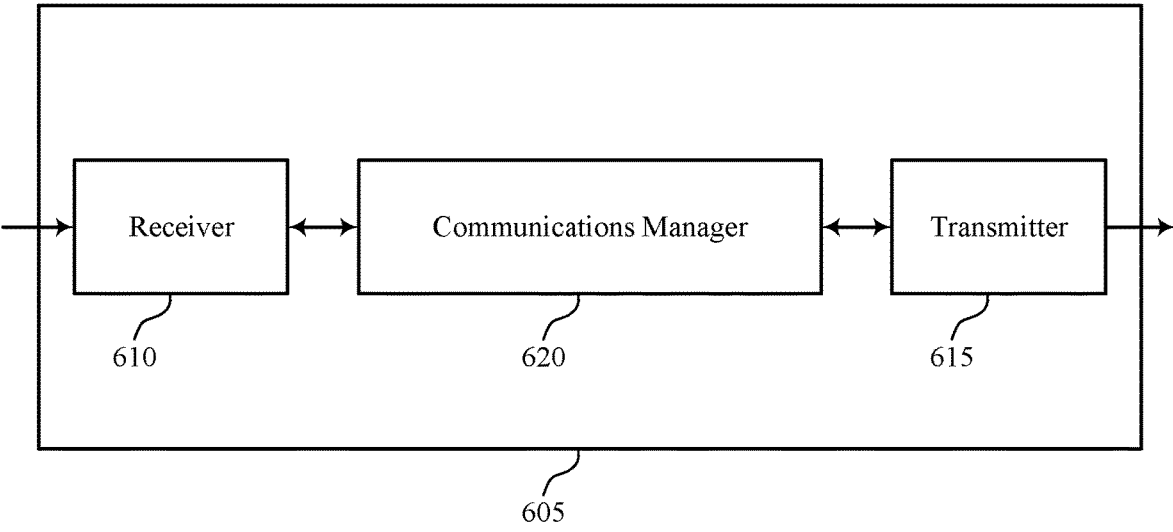
FIGS. 6 and 7 illustrate block diagrams of devices that support efficient full-duplex CSI reporting in accordance with one or more aspects of the present disclosure.

FIG. 6 illustrates a block diagram 600 of a device 605 that supports efficient full-duplex CSI reporting in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to efficient full-duplex CSI reporting). Information may be passed on to other components of the device 605. The receiver 610 may utilize a single antenna or a set of multiple antennas.

The transmitter 615 may provide a means for transmitting signals generated by other components of the device 605.

For example, the transmitter 615 may transmit information such as packets, user data, control information, or any combination thereof associated with various information channels (e.g., control channels, data channels, information channels related to efficient full-duplex CSI reporting). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of efficient full-duplex CSI reporting as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving control signaling indicating at least one reporting configuration for a CSI report, the at least one reporting configuration identifying a first uplink resource for reporting the CSI report in a full-duplex slot type and a second uplink resource for reporting the CSI report in a half-duplex slot type. The communications manager 620 may be configured as or otherwise support a means for monitoring, in accordance with the at least one reporting configuration, a reference signal resource to generate a measurement for the CSI report. The communications manager 620 may be configured as or otherwise support a means for transmitting the CSI report via an uplink resource corresponding to one of the first uplink resource or the second uplink resource based on a slot type of a transmission slot of the uplink resource.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for configuring uplink resources for both full-duplex and half-duplex slot types, which may lead to more efficient utilization of communication resources.

Figure 7:
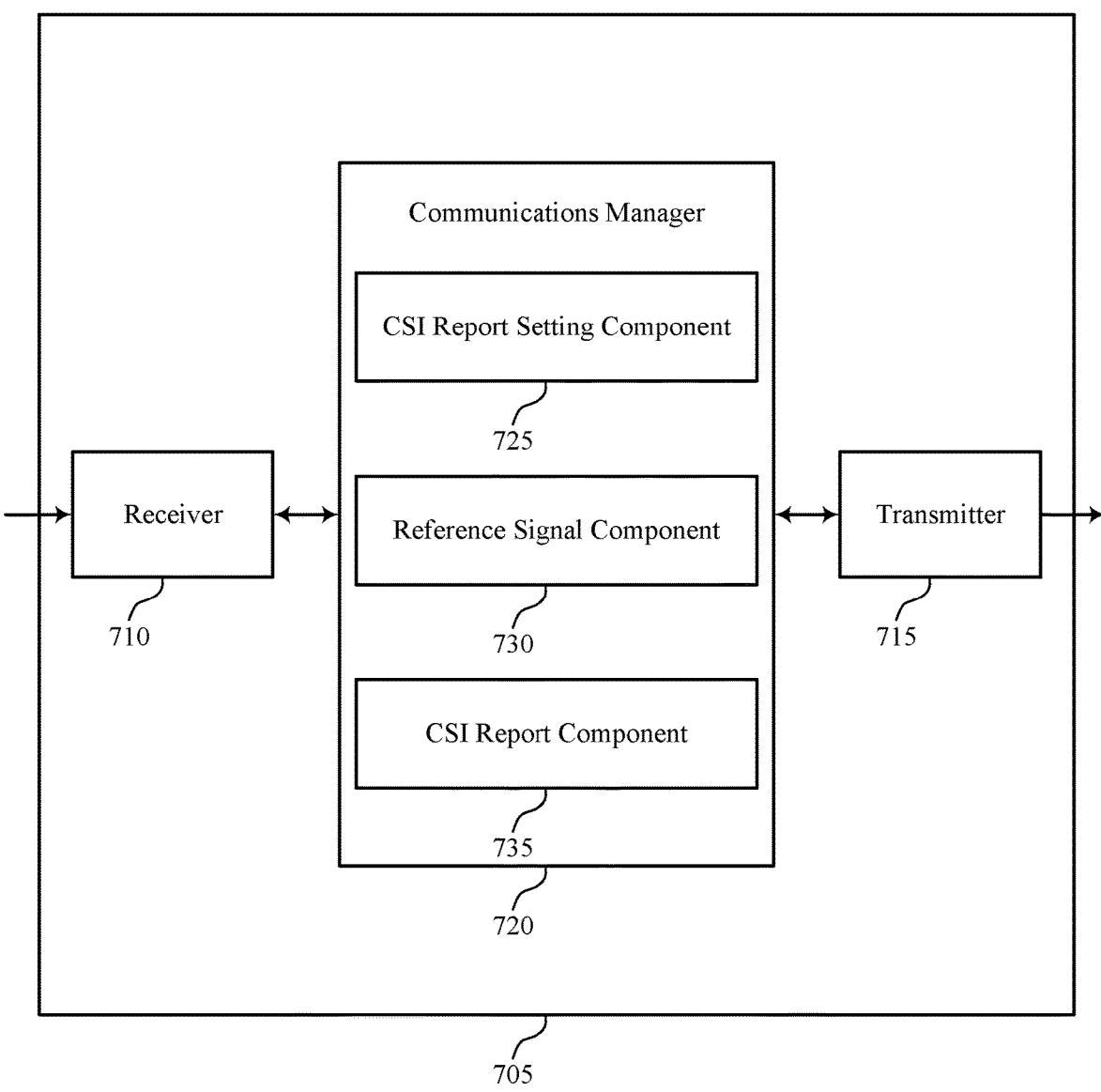

FIG. 7 illustrates a block diagram 700 of a device 705 that supports efficient full-duplex CSI reporting in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to efficient full-duplex CSI reporting). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to efficient full-duplex CSI reporting). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of efficient full-duplex CSI reporting as described herein. For example, the communications manager 720 may include a CSI report setting component 725, a reference signal component 730, a CSI report component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The CSI report setting component 725 may be configured as or otherwise support a means for receiving control signaling indicating at least one reporting configuration for a CSI report, the at least one reporting configuration for a CSI report, the at least one reporting configuration identifying a first uplink resource for reporting the CSI report in a full-duplex slot type and a second uplink resource for reporting the CSI report in a half-duplex slot type. The reference signal component 730 may be configured as or otherwise support a means for monitoring, in accordance with the at least one reporting configuration, a reference signal resource to generate a measurement for the CSI report. The CSI report component 735 may be configured as or otherwise support a means for transmitting the CSI report via an uplink resource corresponding to one of the first uplink resource or the second uplink resource based on a slot type of a transmission slot of the uplink resource.

Figure 8:
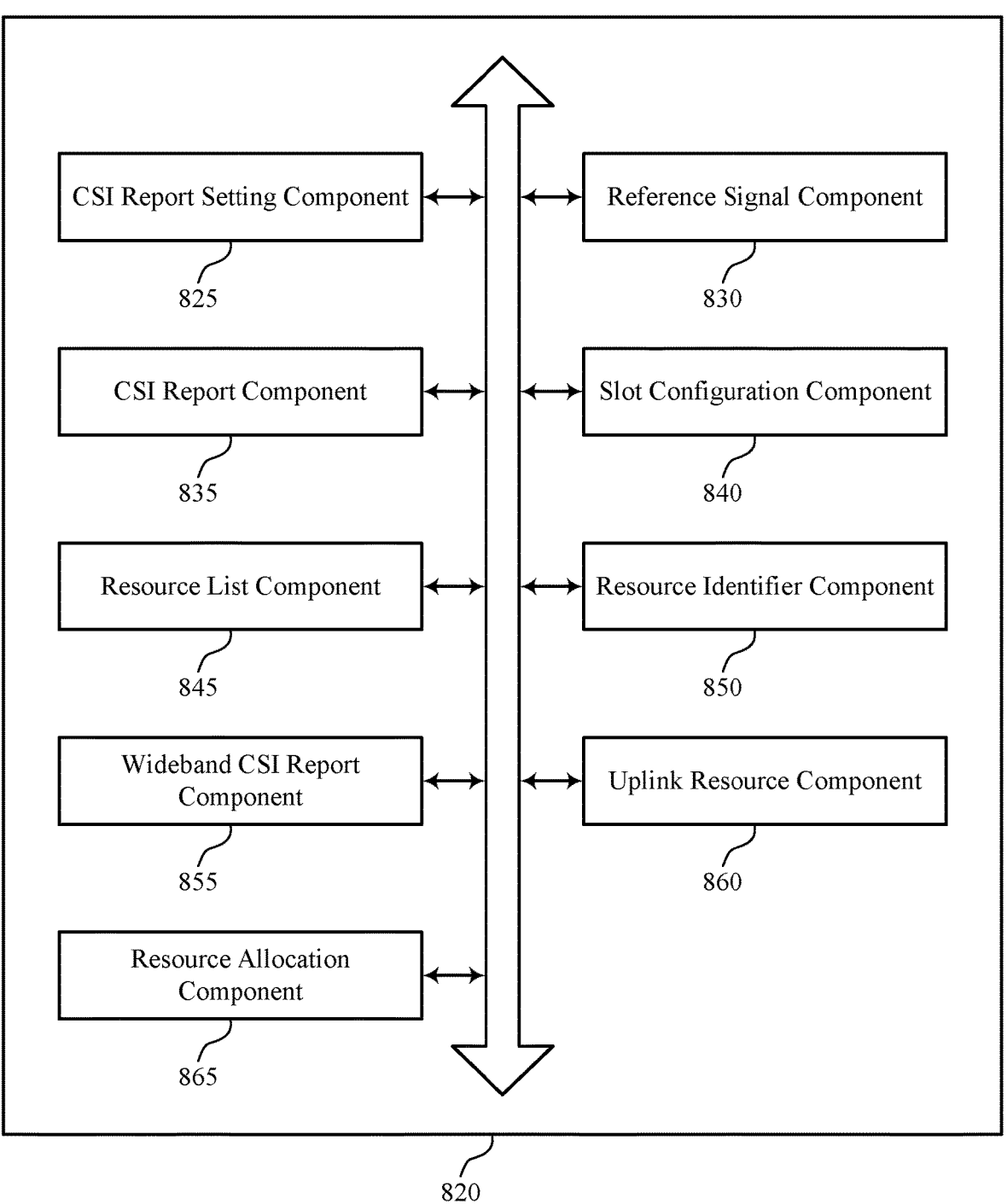
FIG. 8 illustrates a block diagram of a communications manager that supports efficient full-duplex CSI reporting in accordance with one or more aspects of the present disclosure.

FIG. 8 illustrates a block diagram 800 of a communications manager 820 that supports efficient full-duplex CSI reporting in accordance with one or more aspects of the present disclosure. The communications manager 820 may be an example of aspects of a communications manager 620, a communications manager 720, or both, as described herein. The communications manager 820, or various components thereof, may be an example of means for performing various aspects of efficient full-duplex CSI reporting as described herein. For example, the communications manager 820 may include a CSI report setting component 825, a reference signal component 830, a CSI report component 835, a slot configuration component 840, a resource list component 845, a resource identifier component 850, a wideband CSI report component 855, an uplink resource component 860, a resource allocation component 865, or any combination thereof. Each of these components may communicate, directly or indirectly, with one another (e.g., via one or more buses).

The communications manager 820 may support wireless communications at a UE in accordance with examples as disclosed herein. The CSI report setting component 825 may be configured as or otherwise support a means for receiving control signaling indicating at least one reporting configuration for a CSI report, the at least one reporting configuration identifying a first uplink resource for reporting the CSI report in a full-duplex slot type and a second uplink resource for reporting the CSI report in a half-duplex slot type. The reference signal component 830 may be configured as or otherwise support a means for monitoring, in accordance with the at least one reporting configuration, a reference signal resource to generate a measurement for the CSI report. The CSI report component 835 may be configured as or otherwise support a means for transmitting the CSI report via an uplink resource corresponding to one of the first uplink resource or the second uplink resource based on a slot type of a transmission slot of the uplink resource.

In some examples, to support receiving the control signaling indicating the at least one reporting configuration, the slot configuration component 840 may be configured as or otherwise support a means for receiving the control signaling indicating a full-duplex slot reporting configuration, a half-duplex slot reporting configuration, and a resource identifier, where the resource identifier identifies the uplink resource corresponding to one of the first uplink resource of the full-duplex slot reporting configuration or the second uplink resource of the half-duplex slot reporting configuration based on the slot type of the transmission slot of the uplink resource.

In some examples, to support receiving the control signaling, the resource list component 845 may be configured as or otherwise support a means for receiving the control signaling indicating the at least one reporting configuration that identifies a first list of one or more uplink resources for reporting the CSI report in the full-duplex slot type and a second list of one or more uplink resources for reporting the CSI report in the half-duplex slot type, where the first list of one or more uplink resources includes the first uplink resource and the second list of one or more uplink resources includes the second uplink resource.

In some examples, to support receiving the control signaling, the resource identifier component 850 may be configured as or otherwise support a means for receiving the control signaling indicating the at least one reporting configuration that identifies a first resource identifier corresponding to the first uplink resource for reporting the CSI report in the full-duplex slot type and a second resource identifier corresponding to the second uplink resource for reporting the CSI report in a half-duplex slot type.

In some examples, to support transmitting the CSI report, the wideband CSI report component 855 may be configured as or otherwise support a means for transmitting, via the uplink resource, the CSI report that is a wideband CSI report based on the uplink resource including a portion of the first uplink resource that is adapted to fit within an uplink subband of the transmission slot that is a full-duplex slot.

In some examples, the uplink resource component 860 may be configured as or otherwise support a means for refraining from transmitting a second CSI report via an occurrence of the uplink resource in a full-duplex slot based on a quantity of resource elements in the occurrence of the uplink resource in the full-duplex slot.

In some examples, to support transmitting the CSI report, the wideband CSI report component 855 may be configured as or otherwise support a means for transmitting, via the uplink resource, the CSI report that is a wideband CSI report via the uplink resource based on a quantity of resource elements of the uplink resource, the uplink resource including a portion of the first uplink resource that is adapted to fit within an uplink subband of the transmission slot that is a full-duplex slot.

In some examples, the CSI report includes wideband CSI and subband CSI based on a quantity of resource elements of the uplink resource, the uplink resource including a portion of the first uplink resource that is adapted to fit within an uplink subband of the transmission slot that is a full-duplex slot.

In some examples, the resource allocation component 865 may be configured as or otherwise support a means for refraining from transmitting a second CSI report via an occurrence of the uplink resource in a full-duplex slot based on the occurrence of the uplink resource in the full-duplex slot at least partially overlapping with a downlink subband of the full-duplex slot, a guard band of the full-duplex slot, or both.

In some examples, the uplink resource includes a portion of the first uplink resource that is adapted to fit within an uplink subband of a full-duplex slot.

In some examples, the uplink resource corresponds to the first uplink resource based on the slot type of the transmission slot being the full duplex slot type.

In some examples, the uplink resource corresponds to the second uplink resource based on the slot type of the transmission slot being the half duplex slot type.

Figure 9:
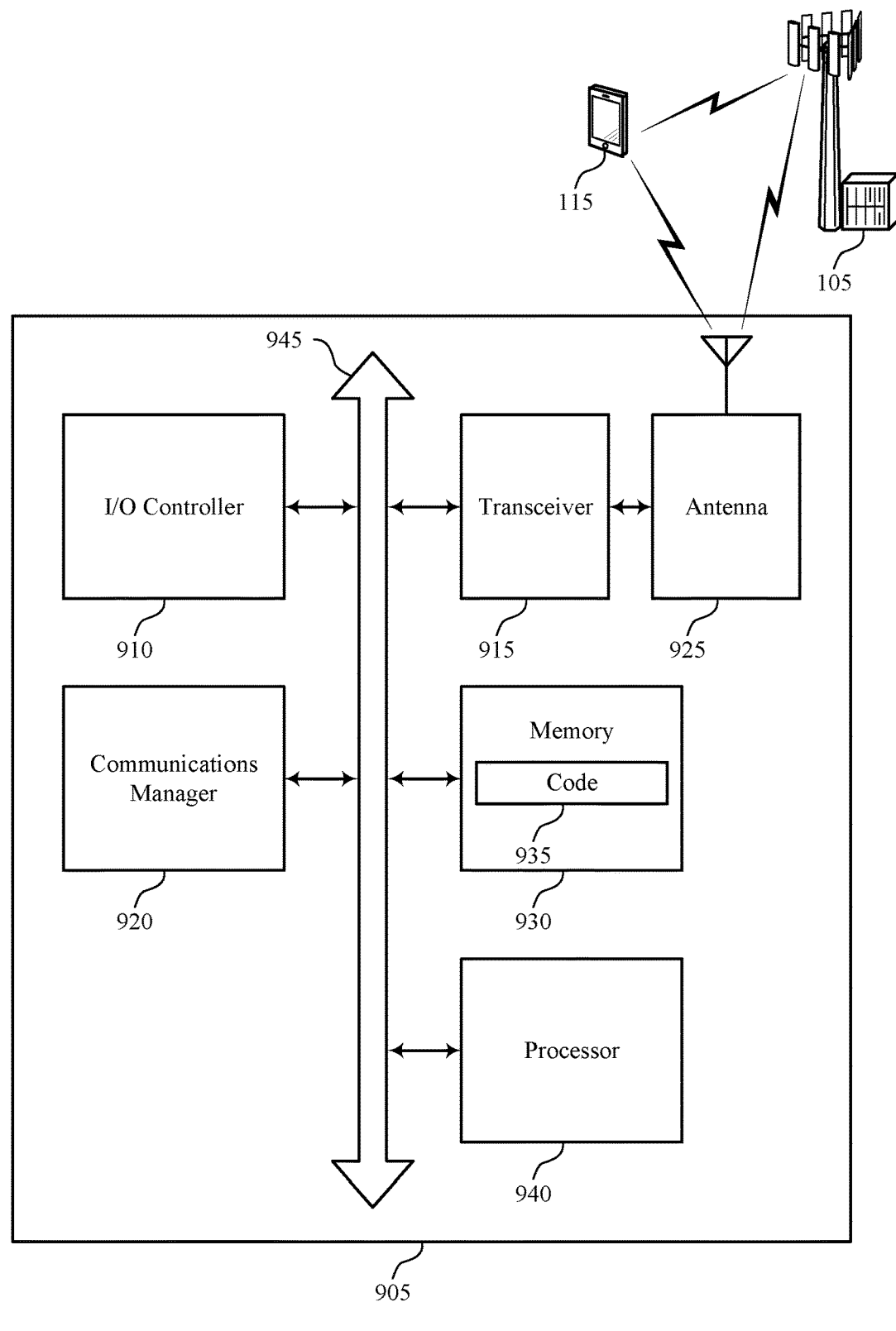
FIG. 9 illustrates a diagram of a system including a device that supports efficient full-duplex CSI reporting in accordance with one or more aspects of the present disclosure.

FIG. 9 illustrates a diagram of a system 900 including a device 905 that supports efficient full-duplex CSI reporting in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOSR, ANDROIDR, MS-DOSR, MS-WINDOWS®, OS/2R, UNIXR, LINUXR, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting efficient full-duplex CSI reporting). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving control signaling indicating at least one reporting configuration for a CSI report, the at least one reporting configuration identifying a first uplink resource for reporting the CSI report in a full-duplex slot type and a second uplink resource for reporting the CSI report in a half-duplex slot type. The communications manager 920 may be configured as or otherwise support a means for monitoring, in accordance with the at least one reporting configuration, a reference signal resource to generate a measurement for the CSI report. The communications manager 920 may be configured as or otherwise support a means for transmitting the CSI report via an uplink resource corresponding to one of the first uplink resource or the second uplink resource based on a slot type of a transmission slot of the uplink resource.

By including or configuring the communications manager 920 in accordance with examples as described herein, the device 905 may support techniques for configuring uplink resources for both full-duplex and half-duplex slot types, which may lead to improved communication reliability, more efficient utilization of communication resources, and improved coordination between device.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of efficient full-duplex CSI reporting as described herein, or the processor 940 and the memory 930 may be otherwise configured to perform or support such operations.

Figure 10:
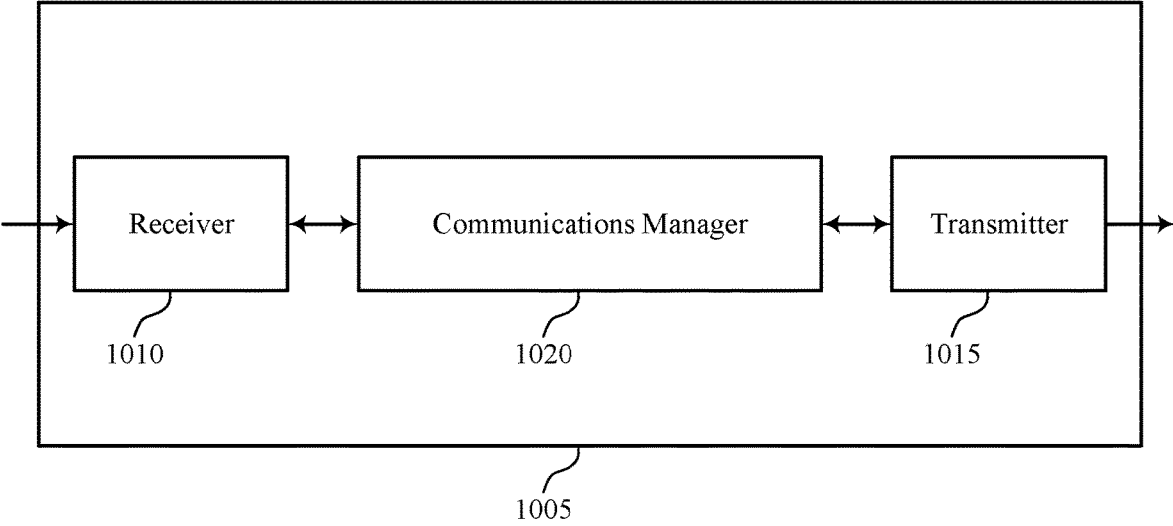
FIGS. 10 and 11 illustrate block diagrams of devices that support efficient full-duplex CSI reporting in accordance with one or more aspects of the present disclosure.

FIG. 10 illustrates a block diagram 1000 of a device 1005 that supports efficient full-duplex CSI reporting in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of efficient full-duplex CSI reporting as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for transmitting control signaling indicating at least one reporting configuration for a CSI report, the at least one reporting configuration identifying a first uplink resource for reporting the CSI report in a full-duplex slot type and a second uplink resource for reporting the CSI report in a half-duplex slot type. The communications manager 1020 may be configured as or otherwise support a means for transmitting, in accordance with the at least one reporting configuration, a reference signal via a reference signal resource. The communications manager 1020 may be configured as or otherwise support a means for receiving, the CSI report via an uplink resource corresponding to one of the first uplink resource or the second uplink resource based on a slot type of a transmission slot of the uplink resource.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for configuring uplink resources for both full-duplex and half-duplex slot types, which may lead to more efficient utilization of communication resources.

Figure 11:
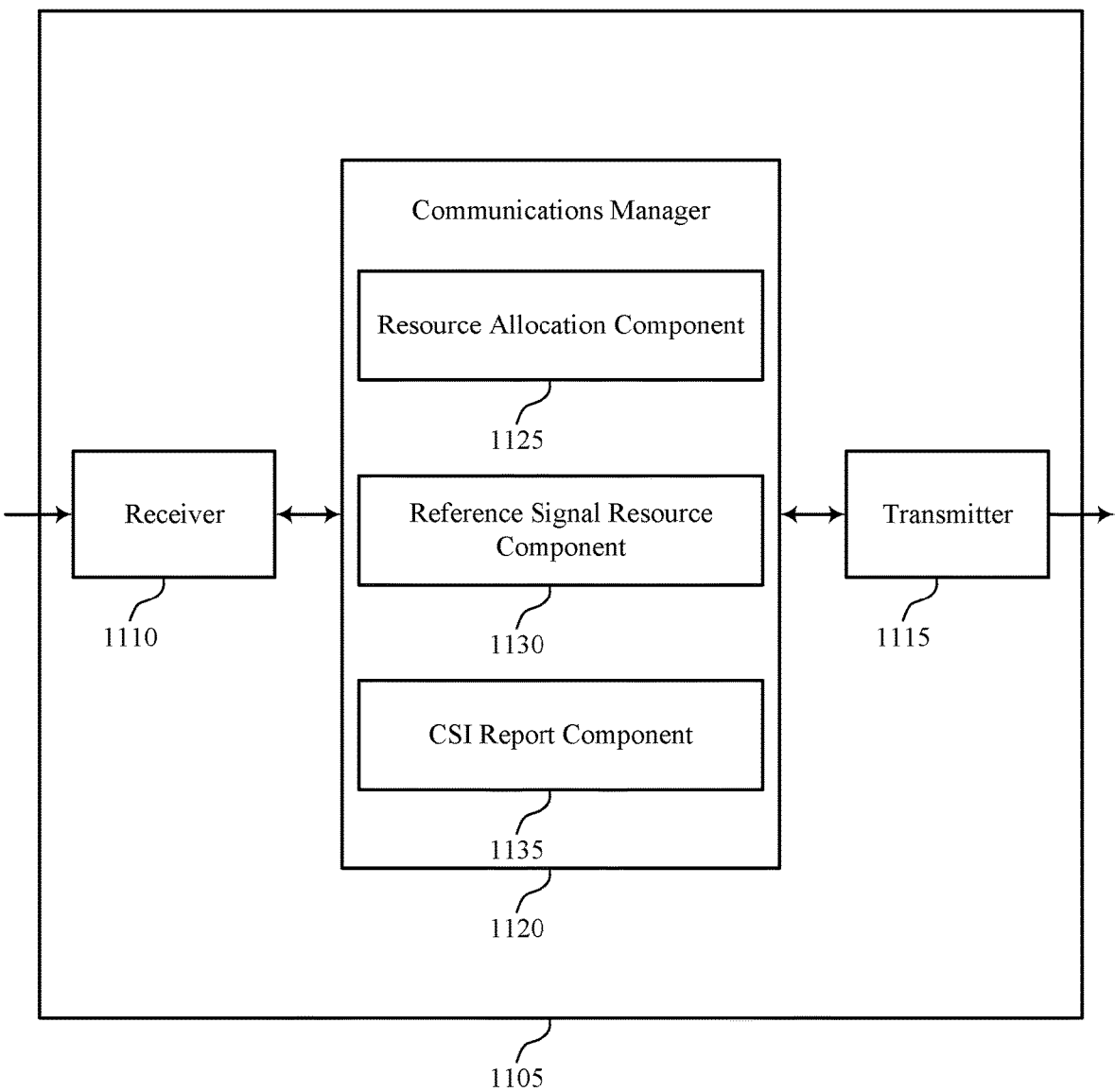

FIG. 11 illustrates a block diagram 1100 of a device 1105 that supports efficient full-duplex CSI reporting in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of efficient full-duplex CSI reporting as described herein. For example, the communications manager 1120 may include a resource allocation component 1125, a reference signal resource component 1130, a CSI report component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The resource allocation component 1125 may be configured as or otherwise support a means for transmitting control signaling indicating at least one reporting configuration for a CSI report, the at least one reporting configuration identifying a first uplink resource for reporting the CSI report in a full-duplex slot type and a second uplink resource for reporting the CSI report in a half-duplex slot type. The reference signal resource component 1130 may be configured as or otherwise support a means for transmitting, in accordance with the at least one reporting configuration, a reference signal via a reference signal resource. The CSI report component 1135 may be configured as or otherwise support a means for receiving, the CSI report via an uplink resource corresponding to one of the first uplink resource or the second uplink resource based on a slot type of a transmission slot of the uplink resource.

Figure 12:
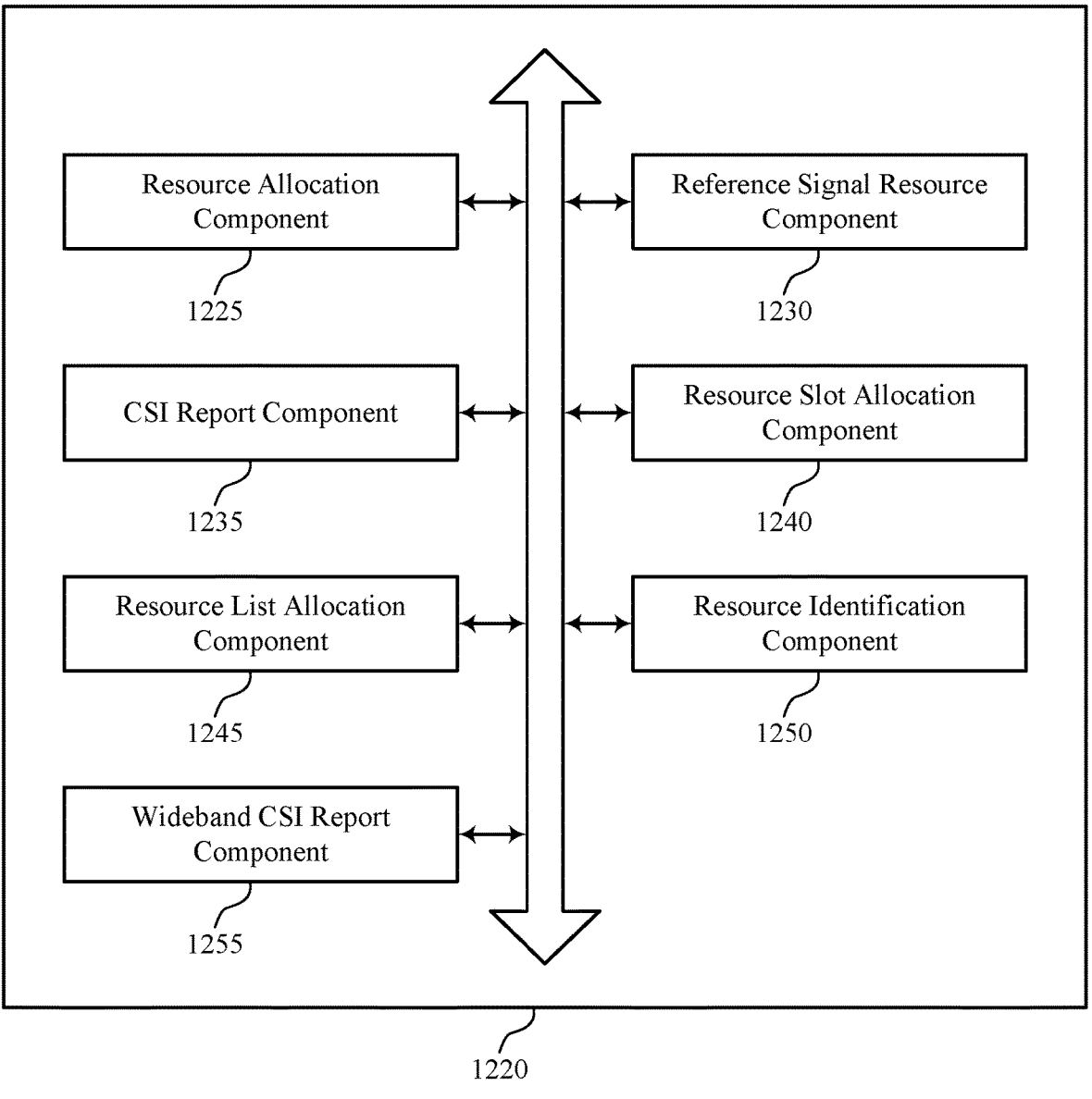
FIG. 12 illustrates a block diagram of a communications manager that supports efficient full-duplex CSI reporting in accordance with one or more aspects of the present disclosure.

FIG. 12 illustrates a block diagram 1200 of a communications manager 1220 that supports efficient full-duplex CSI reporting in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of efficient full-duplex CSI reporting as described herein. For example, the communications manager 1220 may include a resource allocation component 1225, a reference signal resource component 1230, a CSI report component 1235, a resource slot allocation component 1240, a resource list allocation component 1245, a resource identification component 1250, a wideband CSI report component 1255, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The resource allocation component 1225 may be configured as or otherwise support a means for transmitting control signaling indicating at least one reporting configuration for a CSI report, the at least one reporting configuration identifying a first uplink resource for reporting the CSI report in a full-duplex slot type and a second uplink resource for reporting the CSI report in a half-duplex slot type. The reference signal resource component 1230 may be configured as or otherwise support a means for transmitting, in accordance with the at least one reporting configuration, a reference signal via a reference signal resource. The CSI report component 1235 may be configured as or otherwise support a means for receiving, the CSI report via an uplink resource corresponding to one of the first uplink resource or the second uplink resource based on a slot type of a transmission slot of the uplink resource.

In some examples, to support transmitting the control signaling indicating the at least one reporting configuration, the resource slot allocation component 1240 may be configured as or otherwise support a means for transmitting the control signaling indicating a full-duplex slot reporting configuration, a half-duplex slot reporting configuration, and a resource identifier, where the resource identifier identifies the uplink resource corresponding to one of the first uplink resource of the full-duplex slot reporting configuration or the second uplink resource of the half-duplex slot reporting configuration based on the slot type of the transmission slot of the uplink resource.

In some examples, to support transmitting the control signaling, the resource list allocation component 1245 may be configured as or otherwise support a means for transmitting the control signaling indicating the at least one reporting configuration that identifies a first list of one or more uplink resources for reporting the CSI report in the full-duplex slot type and a second list of one or more uplink resources for reporting the CSI report in the half-duplex slot type, where the first list of one or more uplink resources includes the first uplink resource and the second list of one or more uplink resources includes the second uplink resource.

In some examples, to support transmitting the control signaling, the resource identification component 1250 may be configured as or otherwise support a means for transmitting the control signaling indicating the at least one reporting configuration that identifies a first resource identifier corresponding to the first uplink resource for reporting the CSI report in the full-duplex slot type and a second resource identifier corresponding to the second uplink resource for reporting the CSI report in a half-duplex slot type.

In some examples, a second CSI report is dropped during an occurrence of the uplink resource in a full-duplex slot based on the occurrence of the uplink resource in the full-duplex slot at least partially overlapping with a downlink subband of the full-duplex slot, a guard band of the full-duplex slot, or both.

In some examples, to support receiving the CSI report, the wideband CSI report component 1255 may be configured as or otherwise support a means for receiving, via the uplink resource, the CSI report that is a wideband CSI report based on the uplink resource including a portion of the first uplink resource that is adapted to fit within an uplink subband of the transmission slot that is a full-duplex slot.

In some examples, a second CSI report is dropped during an occurrence of the uplink resource in a full-duplex slot based on a quantity of resource elements in the occurrence of the uplink resource in the full-duplex slot.

In some examples, to support receiving the CSI report, the wideband CSI report component 1255 may be configured as or otherwise support a means for receiving, via the uplink resource, the CSI report that is a wideband CSI report via the uplink resource based on a quantity of resource elements of the uplink resource, the uplink resource including a portion of the first uplink resource that is adapted to fit within an uplink subband of the transmission slot that is a full-duplex slot.

In some examples, the CSI report includes wideband CSI and subband CSI based on a quantity of resource elements of the uplink resource, the uplink resource including a portion of the first uplink resource that is adapted to fit within an uplink subband of a full-duplex slot.

In some examples, the uplink resource includes a portion of the first uplink resource that is adapted to fit within an uplink subband of a full-duplex slot.

In some examples, the uplink resource corresponds to the first uplink resource based on the slot type of the transmission slot being the full duplex slot type.

In some examples, the uplink resource corresponds to the second uplink resource based on the slot type of the transmission slot being the half duplex slot type.

Figure 13:
FIG. 13 illustrates a diagram of a system including a device that supports efficient full-duplex CSI reporting in accordance with one or more aspects of the present disclosure.

FIG. 13 illustrates a diagram of a system 1300 including a device 1305 that supports efficient full-duplex CSI reporting in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting efficient full-duplex CSI reporting). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for transmitting control signaling indicating at least one reporting configuration for a CSI report, the at least one reporting configuration identifying a first uplink resource for reporting the CSI report in a full-duplex slot type and a second uplink resource for reporting the CSI report in a half-duplex slot type. The communications manager 1320 may be configured as or otherwise support a means for transmitting, in accordance with the at least one reporting configuration, a reference signal via a reference signal resource. The communications manager 1320 may be configured as or otherwise support a means for receiving, the CSI report via an uplink resource corresponding to one of the first uplink resource or the second uplink resource based on a slot type of a transmission slot of the uplink resource.

By including or configuring the communications manager 1320 in accordance with examples as described herein, the device 1305 may support techniques for configuring uplink resources for both full-duplex and half-duplex slot types, which may lead to improved communication reliability, more efficient utilization of communication resources, and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of efficient full-duplex CSI reporting as described herein, or the processor 1335 and the memory 1325 may be otherwise configured to perform or support such operations.

FIG. 14 illustrates a flowchart showing a method 1400 that supports efficient full-duplex CSI reporting in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving control signaling indicating at least one reporting configuration for a CSI report, the at least one reporting configuration identifying a first uplink resource for reporting the CSI report in a full-duplex slot type and a second uplink resource for reporting the CSI report in a half-duplex slot type. The operations of 1405 may be performed in accordance with examples as disclosed herein. In some examples, aspects of the operations of 1405 may be performed by a CSI report setting component 825 as described with reference to FIG. 8.

At 1410, the method may include monitoring, in accordance with the at least one reporting configuration, a reference signal resource to generate a measurement for the CSI report. The operations of 1410 may be performed in accordance with examples as disclosed herein. In some examples, aspects of the operations of 1410 may be performed by a reference signal component 830 as described with reference to FIG. 8.

At 1415, the method may include transmitting the CSI report via an uplink resource corresponding to one of the first uplink resource or the second uplink resource based on a slot type of a transmission slot of the uplink resource. The operations of 1415 may be performed in accordance with examples as disclosed herein. In some examples, aspects of the operations of 1415 may be performed by a CSI report component 835 as described with reference to FIG. 8.

FIG. 15 illustrates a flowchart showing a method 1500 that supports efficient full-duplex CSI reporting in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving control signaling indicating at least one reporting configuration for a CSI report, the at least one reporting configuration identifying a first uplink resource for reporting the CSI report in a full-duplex slot type and a second uplink resource for reporting the CSI report in a half-duplex slot type. The operations of 1505 may be performed in accordance with examples as disclosed herein. In some examples, aspects of the operations of 1505 may be performed by a CSI report setting component 825 as described with reference to FIG. 8.

At 1510, the method may include monitoring, in accordance with the at least one reporting configuration, a reference signal resource to generate a measurement for the CSI report. The operations of 1510 may be performed in accordance with examples as disclosed herein. In some examples, aspects of the operations of 1510 may be performed by a reference signal component 830 as described with reference to FIG. 8.

At 1515, the method may include transmitting the CSI report via an uplink resource corresponding to one of the first uplink resource or the second uplink resource based on a slot type of a transmission slot of the uplink resource. The operations of 1515 may be performed in accordance with examples as disclosed herein. In some examples, aspects of the operations of 1515 may be performed by a CSI report component 835 as described with reference to FIG. 8.

At 1520, the method may include refraining from transmitting a second CSI report via an occurrence of the uplink resource in a full-duplex slot based on the occurrence of the uplink resource in the full-duplex slot at least partially overlapping with a downlink subband of the full-duplex slot, a guard band of the full-duplex slot, or both. The operations of 1520 may be performed in accordance with examples as disclosed herein. In some examples, aspects of the operations of 1520 may be performed by a resource allocation component 865 as described with reference to FIG. 8.

FIG. 16 illustrates a flowchart showing a method 1600 that supports efficient full-duplex CSI reporting in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting control signaling indicating at least one reporting configuration for a CSI report, the at least one reporting configuration identifying a first uplink resource for reporting the CSI report in a full-duplex slot type and a second uplink resource for reporting the CSI report in a half-duplex slot type. The operations of 1605 may be performed in accordance with examples as disclosed herein. In some examples, aspects of the operations of 1605 may be performed by a resource allocation component 1225 as described with reference to FIG. 12.

At 1610, the method may include transmitting, in accordance with the at least one reporting configuration, a reference signal via a reference signal resource. The operations of 1610 may be performed in accordance with examples as disclosed herein. In some examples, aspects of the operations of 1610 may be performed by a reference signal resource component 1230 as described with reference to FIG. 12.

At 1615, the method may include receiving, the CSI report via an uplink resource corresponding to one of the first uplink resource or the second uplink resource based on a slot type of a transmission slot of the uplink resource. The operations of 1615 may be performed in accordance with examples as disclosed herein. In some examples, aspects of the operations of 1615 may be performed by a CSI report component 1235 as described with reference to FIG. 12.

FIG. 17 illustrates a flowchart showing a method 1700 that supports efficient full-duplex CSI reporting in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting control signaling indicating at least one reporting configuration for a CSI report, the at least one reporting configuration identifying a first uplink resource for reporting the CSI report in a full-duplex slot type and a second uplink resource for reporting the CSI report in a half-duplex slot type. The operations of 1705 may be performed in accordance with examples as disclosed herein. In some examples, aspects of the operations of 1705 may be performed by a resource allocation component 1225 as described with reference to FIG. 12.

At 1710, the method may include transmitting the control signaling indicating a full-duplex slot reporting configuration, a half-duplex slot reporting configuration, and a resource identifier, where the resource identifier identifies the uplink resource corresponding to one of the first uplink resource of the full-duplex slot reporting configuration or the second uplink resource of the half-duplex slot reporting configuration based on the slot type of the transmission slot of the uplink resource. The operations of 1710 may be performed in accordance with examples as disclosed herein. In some examples, aspects of the operations of 1710 may be performed by a resource slot allocation component 1240 as described with reference to FIG. 12.

At 1715, the method may include transmitting, in accordance with the at least one reporting configuration, a reference signal via a reference signal resource. The operations of 1715 may be performed in accordance with examples as disclosed herein. In some examples, aspects of the operations of 1715 may be performed by a reference signal resource component 1230 as described with reference to FIG. 12.

At 1720, the method may include receiving, the CSI report via an uplink resource corresponding to one of the first uplink resource or the second uplink resource based on a slot type of a transmission slot of the uplink resource. The operations of 1720 may be performed in accordance with examples as disclosed herein. In some examples, aspects of the operations of 1720 may be performed by a CSI report component 1235 as described with reference to FIG. 12.

The following provides an overview of aspects of the present disclosure:

Aspect 1: A method for wireless communications at a UE, comprising: receiving control signaling indicating at least one reporting configuration for a CSI report, the at least one reporting configuration identifying a first uplink resource for reporting the CSI report in a full-duplex slot type and a second uplink resource for reporting the CSI report in a half-duplex slot type: monitoring, in accordance with the at least one reporting configuration, a reference signal resource to generate a measurement for the CSI report; and transmitting the CSI report via an uplink resource corresponding to one of the first uplink resource or the second uplink resource based at least in part on a slot type of a transmission slot of the uplink resource.

Aspect 2: The method of aspect 1, wherein receiving the control signaling indicating the at least one reporting configuration further comprises: receiving the control signaling indicating a full-duplex slot reporting configuration, a half-duplex slot reporting configuration, and a resource identifier, wherein the resource identifier identifies the uplink resource corresponding to one of the first uplink resource of the full-duplex slot reporting configuration or the second uplink resource of the half-duplex slot reporting configuration based at least in part on the slot type of the transmission slot of the uplink resource.

Aspect 3: The method of aspect 1, wherein receiving the control signaling comprises: receiving the control signaling indicating the at least one reporting configuration that identifies a first list of one or more uplink resources for reporting the CSI report in the full-duplex slot type and a second list of one or more uplink resources for reporting the CSI report in the half-duplex slot type, wherein the first list of one or more uplink resources includes the first uplink resource and the second list of one or more uplink resources includes the second uplink resource.

Aspect 4: The method of aspect 1, wherein receiving the control signaling comprises: receiving the control signaling indicating the at least one reporting configuration that identifies a first resource identifier corresponding to the first uplink resource for reporting the CSI report in the full-duplex slot type and a second resource identifier corresponding to the second uplink resource for reporting the CSI report in a half-duplex slot type.

Aspect 5: The method of any of aspects 1 through 4, wherein transmitting the CSI report comprises: transmitting, via the uplink resource, the CSI report that is a wideband CSI report based at least in part on the uplink resource comprising a portion of the first uplink resource that is adapted to fit within an uplink subband of the transmission slot that is a full-duplex slot.

Aspect 6: The method of any of aspects 1 through 5, further comprising: refraining from transmitting a second CSI report via an occurrence of the uplink resource in a full-duplex slot based at least in part on a quantity of resource elements in the occurrence of the uplink resource in the full-duplex slot.

Aspect 7: The method of any of aspects 1 through 6, wherein transmitting the CSI report comprises: transmitting, via the uplink resource, the CSI report that is a wideband CSI report via the uplink resource based at least in part on a quantity of resource elements of the uplink resource, the uplink resource comprising a portion of the first uplink resource that is adapted to fit within an uplink subband of the transmission slot that is a full-duplex slot.

Aspect 8: The method of any of aspects 1 through 7, wherein the CSI report comprises wideband CSI and sub-band CSI based at least in part on a quantity of resource elements of the uplink resource, the uplink resource comprising a portion of the first uplink resource that is adapted to fit within an uplink subband of the transmission slot that is a full-duplex slot.

Aspect 9: The method of any of aspects 1 through 8, further comprising: refraining from transmitting a second CSI report via an occurrence of the uplink resource in a full-duplex slot based at least in part on the occurrence of the uplink resource in the full-duplex slot at least partially overlapping with a downlink subband of the full-duplex slot, a guard band of the full-duplex slot, or both.

Aspect 10: The method of any of aspects 1 through 9, wherein the uplink resource comprises a portion of the first uplink resource that is adapted to fit within an uplink subband of a full-duplex slot.

Aspect 11: The method of any of aspects 1 through 10, wherein the uplink resource corresponds to the first uplink resource based at least in part on the slot type of the transmission slot being the full duplex slot type.

Aspect 12: The method of any of aspects 1 through 11, wherein the uplink resource corresponds to the second uplink resource based at least in part on the slot type of the transmission slot being the half duplex slot type.

Aspect 13: A method for wireless communications at a network entity, comprising: transmitting control signaling indicating at least one reporting configuration for a CSI report, the at least one reporting configuration identifying a first uplink resource for reporting the CSI report in a full-duplex slot type and a second uplink resource for reporting the CSI report in a half-duplex slot type: transmitting, in accordance with the at least one reporting configuration, a reference signal via a reference signal resource; and receiving, the CSI report via an uplink resource corresponding to one of the first uplink resource or the second uplink resource based at least in part on a slot type of a transmission slot of the uplink resource.

Aspect 14: The method of aspect 13, wherein transmitting the control signaling indicating the at least one reporting configuration further comprises: transmitting the control signaling indicating a full-duplex slot reporting configuration, a half-duplex slot reporting configuration, and a resource identifier, wherein the resource identifier identifies the uplink resource corresponding to one of the first uplink resource of the full-duplex slot reporting configuration or the second uplink resource of the half-duplex slot reporting configuration based at least in part on the slot type of the transmission slot of the uplink resource.

Aspect 15: The method of aspect 13, wherein transmitting the control signaling comprises: transmitting the control signaling indicating the at least one reporting configuration that identifies a first list of one or more uplink resources for reporting the CSI report in the full-duplex slot type and a second list of one or more uplink resources for reporting the CSI report in the half-duplex slot type, wherein the first list of one or more uplink resources includes the first uplink resource and the second list of one or more uplink resources includes the second uplink resource.

Aspect 16: The method of aspect 13, wherein transmitting the control signaling comprises: transmitting the control signaling indicating the at least one reporting configuration that identifies a first resource identifier corresponding to the first uplink resource for reporting the CSI report in the full-duplex slot type and a second resource identifier corresponding to the second uplink resource for reporting the CSI report in a half-duplex slot type.

Aspect 17: The method of any of aspects 13 through 16, wherein a second CSI report is dropped during an occurrence of the uplink resource in a full-duplex slot based at least in part on the occurrence of the uplink resource in the full-duplex slot at least partially overlapping with a downlink subband of the full-duplex slot, a guard band of the full-duplex slot, or both.

Aspect 18: The method of any of aspects 13 through 17, wherein receiving the CSI report comprises: receiving, via the uplink resource, the CSI report that is a wideband CSI report based at least in part on the uplink resource comprising a portion of the first uplink resource that is adapted to fit within an uplink subband of the transmission slot that is a full-duplex slot.

Aspect 19: The method of any of aspects 13 through 18, wherein a second CSI report is dropped during an occurrence of the uplink resource in a full-duplex slot based at least in part on a quantity of resource elements in the occurrence of the uplink resource in the full-duplex slot.

Aspect 20: The method of any of aspects 13 through 19, wherein receiving the CSI report comprises: receiving, via the uplink resource, the CSI report that is a wideband CSI report via the uplink resource based at least in part on a quantity of resource elements of the uplink resource, the uplink resource comprising a portion of the first uplink resource that is adapted to fit within an uplink subband of the transmission slot that is a full-duplex slot.

Aspect 21: The method of any of aspects 13 through 20, wherein the CSI report comprises wideband CSI and sub-band CSI based at least in part on a quantity of resource elements of the uplink resource, the uplink resource comprising a portion of the first uplink resource that is adapted to fit within an uplink subband of a full-duplex slot.

Aspect 22: The method of any of aspects 13 through 21, wherein the uplink resource comprises a portion of the first uplink resource that is adapted to fit within an uplink subband of a full-duplex slot.

Aspect 23: The method of any of aspects 13 through 22, wherein the uplink resource corresponds to the first uplink resource based at least in part on the slot type of the transmission slot being the full duplex slot type.

Aspect 24: The method of any of aspects 13 through 23, wherein the uplink resource corresponds to the second uplink resource based at least in part on the slot type of the transmission slot being the half duplex slot type.

Aspect 25: An apparatus for wireless communications at a UE, comprising a processor; memory coupled with the processor; and instructions stored in the memory and executable by the processor to cause the apparatus to perform a method of any of aspects 1 through 12.

Aspect 26: An apparatus for wireless communications at a UE, comprising at least one means for performing a method of any of aspects 1 through 12.

Aspect 27: A non-transitory computer-readable medium storing code for wireless communications at a UE, the code comprising instructions executable by a processor to perform a method of any of aspects 1 through 12.

Aspect 28: An apparatus for wireless communications at a network entity, comprising one or more processors: one or more memories coupled with the one or more processors; and instructions stored in the one or more memories and executable by the one or more processors to cause the apparatus to perform a method of any of aspects 13 through 24.

Aspect 29: An apparatus for wireless communications at a network entity, comprising at least one means for performing a method of any of aspects 13 through 24.

Aspect 30: A non-transitory computer-readable medium storing code for wireless communications at a network entity, the code comprising instructions executable by one or more processors to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer.

By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

one or more processors;

one or more memories coupled with the one or more processors; and instructions stored in the one or more memories and executable by the one or more processors to cause the apparatus to:

receive control signaling indicating at least one reporting configuration for a channel state information report, the at least one reporting configuration identifying a first uplink resource for reporting the channel state information report in a full-duplex slot type and a second uplink resource for reporting the channel state information report in a half-duplex slot type;

monitor, in accordance with the at least one reporting configuration, a reference signal resource to generate a measurement for the channel state information report; and transmit the channel state information report via an uplink resource corresponding to one of the first uplink resource or the second uplink resource based at least in part on a slot type of a transmission slot of the uplink resource.

2. The apparatus of claim 1, wherein the instructions to receive the control signaling indicating the at least one reporting configuration are further executable by the one or more processors to cause the apparatus to:

receive the control signaling indicating a full-duplex slot reporting configuration, a half-duplex slot reporting configuration, and a resource identifier, wherein the resource identifier identifies the uplink resource corresponding to one of the first uplink resource of the full-duplex slot reporting configuration or the second uplink resource of the half-duplex slot reporting configuration based at least in part on the slot type of the transmission slot of the uplink resource.

3. The apparatus of claim 1, wherein the instructions to receive the control signaling are executable by the one or more processors to cause the apparatus to:

receive the control signaling indicating the at least one reporting configuration that identifies a first list of one or more uplink resources for reporting the channel state information report in the full-duplex slot type and a second list of one or more uplink resources for reporting the channel state information report in the half-duplex slot type, wherein the first list of one or more uplink resources includes the first uplink resource and the second list of one or more uplink resources includes the second uplink resource.

4. The apparatus of claim 1, wherein the instructions to receive the control signaling are executable by the one or more processors to cause the apparatus to:

receive the control signaling indicating the at least one reporting configuration that identifies a first resource identifier corresponding to the first uplink resource for reporting the channel state information report in the full-duplex slot type and a second resource identifier corresponding to the second uplink resource for reporting the channel state information report in the half-duplex slot type.

5. The apparatus of claim 1, wherein the instructions to transmit the channel state information report are executable by the one or more processors to cause the apparatus to:

transmit, via the uplink resource, the channel state information report that is a wideband channel state information report based at least in part on the uplink resource comprising a portion of the first uplink resource that is adapted to fit within an uplink subband of the transmission slot that is a full-duplex slot.

6. The apparatus of claim 1, wherein the instructions are further executable by the one or more processors to cause the apparatus to:

refrain from transmitting a second channel state information report via an occurrence of the uplink resource in a full-duplex slot based at least in part on a quantity of resource elements in the occurrence of the uplink resource in the full-duplex slot.

7. The apparatus of claim 1, wherein the instructions to transmit the channel state information report are executable by the one or more processors to cause the apparatus to:

transmit, via the uplink resource, the channel state information report that is a wideband channel state information report via the uplink resource based at least in part on a quantity of resource elements of the uplink resource, the uplink resource comprising a portion of the first uplink resource that is adapted to fit within an uplink subband of the transmission slot that is a full-duplex slot.

8. The apparatus of claim 1, wherein the channel state information report comprises wideband channel state information and subband channel state information based at least in part on a quantity of resource elements of the uplink resource, the uplink resource comprising a portion of the first uplink resource that is adapted to fit within an uplink subband of the transmission slot that is a full-duplex slot.

9. The apparatus of claim 1, wherein the instructions are further executable by the one or more processors to cause the apparatus to:

refrain from transmitting a second channel state information report via an occurrence of the uplink resource in a full-duplex slot based at least in part on the occurrence of the uplink resource in the full-duplex slot at least partially overlapping with a downlink subband of the full-duplex slot, a guard band of the full-duplex slot, or both.

10. The apparatus of claim 1, wherein the uplink resource comprises a portion of the first uplink resource that is adapted to fit within an uplink subband of a full-duplex slot.

11. The apparatus of claim 1, wherein the uplink resource corresponds to the first uplink resource based at least in part on the slot type of the transmission slot being the full-duplex slot type.

12. The apparatus of claim 1, wherein the uplink resource corresponds to the second uplink resource based at least in part on the slot type of the transmission slot being the half-duplex slot type.

13. An apparatus for wireless communications at a network entity, comprising:

one or more processors;

one or more memories coupled with the one or more processors; and instructions stored in the one or more memories and executable by the one or more processors to cause the apparatus to:

transmit control signaling indicating at least one reporting configuration for a channel state information report, the at least one reporting configuration identifying a first uplink resource for reporting the channel state information report in a full-duplex slot type and a second uplink resource for reporting the channel state information report in a half-duplex slot type;

transmit, in accordance with the at least one reporting configuration, a reference signal via a reference signal resource; and receive, the channel state information report via an uplink resource corresponding to one of the first uplink resource or the second uplink resource based at least in part on a slot type of a transmission slot of the uplink resource.

14. The apparatus of claim 13, wherein the instructions to transmit the control signaling indicating the at least one reporting configuration are further executable by the one or more processors to cause the apparatus to:

transmit the control signaling indicating a full-duplex slot reporting configuration, a half-duplex slot reporting configuration, and a resource identifier, wherein the resource identifier identifies the uplink resource corresponding to one of the first uplink resource of the full-duplex slot reporting configuration or the second uplink resource of the half-duplex slot reporting configuration based at least in part on the slot type of the transmission slot of the uplink resource.

15. The apparatus of claim 13, wherein the instructions to transmit the control signaling are executable by the one or more processors to cause the apparatus to:

transmit the control signaling indicating the at least one reporting configuration that identifies a first list of one or more uplink resources for reporting the channel state information report in the full-duplex slot type and a second list of one or more uplink resources for reporting the channel state information report in the half-duplex slot type, wherein the first list of one or more uplink resources includes the first uplink resource and the second list of one or more uplink resources includes the second uplink resource.

16. The apparatus of claim 13, wherein the instructions to transmit the control signaling are executable by the one or more processors to cause the apparatus to:

transmit the control signaling indicating the at least one reporting configuration that identifies a first resource identifier corresponding to the first uplink resource for reporting the channel state information report in the full-duplex slot type and a second resource identifier corresponding to the second uplink resource for reporting the channel state information report in the half-duplex slot type.

17. The apparatus of claim 13, wherein a second channel state information report is dropped during an occurrence of the uplink resource in a full-duplex slot based at least in part on the occurrence of the uplink resource in the full-duplex slot at least partially overlapping with a downlink subband of the full-duplex slot, a guard band of the full-duplex slot, or both.

18. The apparatus of claim 13, wherein the instructions to receive the channel state information report are executable by the one or more processors to cause the apparatus to:

receive, via the uplink resource, the channel state information report that is a wideband channel state information report based at least in part on the uplink resource comprising a portion of the first uplink resource that is adapted to fit within an uplink subband of the transmission slot that is a full-duplex slot.

19. The apparatus of claim 13, wherein a second channel state information report is dropped during an occurrence of the uplink resource in a full-duplex slot based at least in part on a quantity of resource elements in the occurrence of the uplink resource in the full-duplex slot.

20. The apparatus of claim 13, wherein the instructions to receive the channel state information report are executable by the one or more processors to cause the apparatus to:

receive, via the uplink resource, the channel state information report that is a wideband channel state information report via the uplink resource based at least in part on a quantity of resource elements of the uplink resource, the uplink resource comprising a portion of the first uplink resource that is adapted to fit within an uplink subband of the transmission slot that is a full-duplex slot.

21. The apparatus of claim 13, wherein the channel state information report comprises wideband channel state information and subband channel state information based at least in part on a quantity of resource elements of the uplink resource, the uplink resource comprising a portion of the first uplink resource that is adapted to fit within an uplink subband of a full-duplex slot.

22. The apparatus of claim 13, wherein the uplink resource comprises a portion of the first uplink resource that is adapted to fit within an uplink subband of a full-duplex slot.

23. The apparatus of claim 13, wherein the uplink resource corresponds to the first uplink resource based at least in part on the slot type of the transmission slot being the full-duplex slot type.

24. The apparatus of claim 13, wherein the uplink resource corresponds to the second uplink resource based at least in part on the slot type of the transmission slot being the half-duplex slot type.

25. A method for wireless communications at a user equipment (UE), comprising:

receiving control signaling indicating at least one reporting configuration for a channel state information report, the at least one reporting configuration identifying a first uplink resource for reporting the channel state information report in a full-duplex slot type and a second uplink resource for reporting the channel state information report in a half-duplex slot type;

monitoring, in accordance with the at least one reporting configuration, a reference signal resource to generate a measurement for the channel state information report; and transmitting the channel state information report via an uplink resource corresponding to one of the first uplink resource or the second uplink resource based at least in part on a slot type of a transmission slot of the uplink resource.

26. The method of claim 25, wherein receiving the control signaling indicating the at least one reporting configuration further comprises:

receiving the control signaling indicating a full-duplex slot reporting configuration, a half-duplex slot reporting configuration, and a resource identifier, wherein the resource identifier identifies the uplink resource corresponding to one of the first uplink resource of the full-duplex slot reporting configuration or the second uplink resource of the half-duplex slot reporting configuration based at least in part on the slot type of the transmission slot of the uplink resource.

27. The method of claim 25, wherein receiving the control signaling comprises:

receiving the control signaling indicating the at least one reporting configuration that identifies a first list of one or more uplink resources for reporting the channel state information report in the full-duplex slot type and a second list of one or more uplink resources for reporting the channel state information report in the half-duplex slot type, wherein the first list of one or more uplink resources includes the first uplink resource and the second list of one or more uplink resources includes the second uplink resource.

28. The method of claim 25, wherein receiving the control signaling comprises:

receiving the control signaling indicating the at least one reporting configuration that identifies a first resource identifier corresponding to the first uplink resource for reporting the channel state information report in the full-duplex slot type and a second resource identifier corresponding to the second uplink resource for reporting the channel state information report in a half-duplex slot type.

29. A method for wireless communications at a network entity, comprising:

transmitting control signaling indicating at least one reporting configuration for a channel state information report, the at least one reporting configuration identifying a first uplink resource for reporting the channel state information report in a full-duplex slot type and a second uplink resource for reporting the channel state information report in a half-duplex slot type;

transmitting, in accordance with the at least one reporting configuration, a reference signal via a reference signal resource; and receiving, the channel state information report via an uplink resource corresponding to one of the first uplink resource or the second uplink resource based at least in part on a slot type of a transmission slot of the uplink resource.

30. The method of claim 29, wherein transmitting the control signaling indicating the at least one reporting configuration further comprises:

transmitting the control signaling indicating a full-duplex slot reporting configuration, a half-duplex slot reporting configuration, and a resource identifier, wherein the resource identifier identifies the uplink resource corresponding to one of the first uplink resource of the full-duplex slot reporting configuration or the second uplink resource of the half-duplex slot reporting configuration based at least in part on the slot type of the transmission slot of the uplink resource.

* * * * *